United States Patent
Winstanley et al.

(10) Patent No.: US 10,079,493 B2
(45) Date of Patent: Sep. 18, 2018

(54) PARALLEL MODULAR CONVERTER ARCHITECTURE

(71) Applicant: The Boeing Company, Chicago, IL (US)

(72) Inventors: Adam J. Winstanley, Woodinville, WA (US); Eugene V. Solodovnik, Lake Stevens, WA (US); Kamiar J. Karimi, Kirkland, WA (US); Shengyi Liu, Sammamish, WA (US); Lijun Gao, Renton, WA (US); Matthew J. Krolak, Renton, WA (US)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 14/502,350

(22) Filed: Sep. 30, 2014

(65) Prior Publication Data

US 2016/0094039 A1    Mar. 31, 2016

(51) Int. Cl.
*H02J 3/18* (2006.01)
*H02J 50/10* (2016.01)
(Continued)

(52) U.S. Cl.
CPC .......... *H02J 4/00* (2013.01); *G05B 23/0286* (2013.01); *H02M 1/32* (2013.01); *H02M 7/493* (2013.01);
(Continued)

(58) Field of Classification Search
CPC ............ H02J 1/106; H02J 7/34; H02J 7/0024
See application file for complete search history.

(56) References Cited

U.S. PATENT DOCUMENTS

| 5,486,747 A * | 1/1996 | Welch ............. H02P 6/00 318/569 |
| 2004/0138786 A1* | 7/2004 | Blackett ............ G01D 4/00 700/295 |

(Continued)

FOREIGN PATENT DOCUMENTS

| EP | 0409226 A2 | 1/1991 |
| WO | 2014025734 A2 | 2/2014 |

OTHER PUBLICATIONS

Partial European Search Report for EP15187281, dated Feb. 26, 2016.
(Continued)

*Primary Examiner* — Bickey Dhakal
*Assistant Examiner* — Charles S Laughlin
(74) *Attorney, Agent, or Firm* — Patterson + Sheridan, LLP

(57) ABSTRACT

A system and method for providing power to a vehicle is disclosed. The system can include a plurality of parallel module converter modules ("modules") each capable of supplying a predetermined electrical load. The plurality of parallel module converter modules can be networked to form a parallel module converter ("converter") for prioritizing and allocating each electrical load to one or more parallel module converter modules. Each module can include an internal protection controller and a logic controller. The individual modules can provide power to various loads in the vehicle either alone, or in concert with other modules. The system can enable fewer power controllers to be used, saving weight and time. The controllers in the system can also be utilized at a higher level reducing unnecessary redundancy.

29 Claims, 19 Drawing Sheets

(51) Int. Cl.
*H02J 4/00* (2006.01)
*G05B 23/02* (2006.01)
*H02M 7/493* (2007.01)
*H02M 1/32* (2007.01)
*H02M 1/00* (2006.01)

(52) U.S. Cl.
CPC ... *B64D 2221/00* (2013.01); *H02M 2001/008* (2013.01); *H02M 2001/0048* (2013.01); *H02M 2001/325* (2013.01); *Y02B 70/1491* (2013.01)

(56) References Cited

U.S. PATENT DOCUMENTS

| | | | | | |
|---|---|---|---|---|---|
| 2007/0259545 | A1* | 11/2007 | Berenger | ................... | H02J 1/10 439/135 |
| 2007/0295545 | A1 | 11/2007 | Berenger | | |
| 2008/0100136 | A1* | 5/2008 | Langlois | ................... | H02J 1/10 307/9.1 |
| 2008/0111421 | A1* | 5/2008 | Anghel | ................... | H02M 7/81 307/23 |
| 2009/0156068 | A1* | 6/2009 | Barrett | ................... | B63H 21/20 440/3 |
| 2010/0013419 | A1* | 1/2010 | White | ................... | H02P 5/46 318/51 |
| 2012/0013284 | A1* | 1/2012 | Campbell | ................ | H02H 7/08 318/490 |
| 2013/0343105 | A1* | 12/2013 | Kosugi | ................... | H02M 1/32 363/56.01 |
| 2014/0233289 | A1* | 8/2014 | Zhao | ................... | H02M 7/5395 363/131 |

OTHER PUBLICATIONS

Extended European Search Report for EP 15187281.9, dated Jun. 28, 2016.

* cited by examiner

MC 1,2,3: REPRESENTS THREE MOTOR CONTROL ALGORITHMS
CSN: CONTROL SWITCHING NETWORK
INVS: INVERTER MODULES
PSN: POWER SWITCHING NETWORK
M1,2,3: REPRESENT THREE MOTORS, CAN BE VARIOUS TYPES

PARALLEL MODULAR CONVERTER ARCHITECTURE

BACKGROUND

1. Field of the Disclosure

Embodiments of the present disclosure relate generally to power management and specifically to a system and method for providing improved modular parallel converter architecture for powering multiple loads with multiple parallel modular converter modules.

2. Background of Related Art

Modern vehicles use a large number of electronics, motors, heaters, and other electrically driven equipment. Electric motors, in particular, are ubiquitous in modern vehicles, including aircraft, and power everything from hydraulic pumps to cabin fans. Conventionally, each of these electric motors has been driven by an independent motor controller. Each motor controller is sized to be able to carry the maximum amount of current required to power its respective motor at full power for an extended period of time (and generally, includes some additional capacity for safety) without overheating or malfunctioning.

As a result, each aircraft carries an excessive number of motor controllers, each of which is oversized and underutilized a majority of the time. In other words, the motor controller includes enough capacity to run the motor at full power for an extended period of time plus a safety margin, but motors are rarely, if ever, run at full capacity. This is because the motors themselves have some safety margin built in and because, a majority of the time, the motors are operating in a lower demand regime (e.g., the cabin fan is not always on "High"). In addition, some motors are only used occasionally, or during specific flight segments, and are unused the remainder of the time. As a result, many of an aircraft's complement of heavy, expensive motor controllers spend a majority of their service life either inactive or significantly below their rated power outputs.

What is needed, therefore, is a system architecture that enables the use of multiple, modular, assignable, dynamically reconfigurable motor controllers that can work alone or in parallel with other parallel motor controllers to meet power control needs. The system should enable one or more parallel controllers to be assigned to each active electrical load in the aircraft, as necessary, to meet existing power demands. The system should enable the capacity of each motor controller to be more fully utilized, reducing system weight, cost, and complexity. It is to such a system that embodiments of the present disclosure are primarily directed.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure relate to a modular power distribution and power conversion system for electrical loads. The system can include a plurality of parallel module converter modules ("modules") linked to form a parallel module converter ("converter"). Each module can be used alone, or in conjunction with other modules, to meet a particular power demand. Modules 100 can also be assigned to loads based on the priority of the loads represented.

Embodiments of the present disclosure can comprise a first parallel module converter module comprising a logic processor to determine a first pulse width modulation (PWM) frequency and duration and generate a corresponding first control signal, a motor control digital signal processor (DSP) to generate a PWM signal based on the first control signal, a gate driver to activate an inverter to produce an alternating current (AC) output signal based on the PWM signal, and a module communications bus to communicate between the first parallel module converter module and a second parallel module converter module.

Embodiments of the present disclosure can also comprise a parallel module converter comprising a first parallel module converter module to provide a first alternating current (AC) output signal and connected to a module communications bus, a second parallel module converter module to provide a second AC output signal and connected to the module communications bus, and a master logic controller to assign a first load to one or more of the first parallel module converter module and the second parallel module converter module. In some embodiments, the module communications bus can connect the first parallel module converter module and the second parallel module converter module. The system can also comprise a master communications controller connected to the module communications bus and the master logic controller to route messages therebetween.

Embodiments of the present disclosure can also comprise a method of providing power. In some embodiments, the method can comprise connecting a first parallel module converter module and second parallel module converter module, and a master logic controller with a parallel module converter module communications bus, routing communications between the first parallel module converter module, the second parallel module converter module, and the master logic controller with a master communications controller, and receiving one or more load requests from one or more aircraft systems at the master logic controller. In some embodiments, the method can further comprise assigning the one or more load requests to the first parallel module converter module, the second parallel module converter module, or both with the master logic controller. In some embodiments, the first parallel module converter module can provides a first AC signal and the second parallel module converter module can provide a second AC signal.

Embodiments of the present disclosure can further comprise a method for providing power comprising receiving a request for a first load from an external aircraft system at a master logic controller, assigning the first load to a first parallel module converter module with the master logic controller, providing a first motor control algorithm to the first parallel module converter module with a control switching network, and connecting the first parallel module converter module to the first load with a first switch of a power switching network.

Embodiments of the present disclosure can further comprise method for providing power comprising receiving a request for a first load from a first external aircraft system at a master logic controller, receiving a request for a second load from a second external aircraft system at the master logic controller, placing a first parallel module converter module and a second parallel module converter module in parallel with a power switching network, assigning the first load to a the first parallel module converter module and the second parallel module converter module with the master logic controller, assigning the second load to a third parallel module converter module with the master logic controller, detecting an increase in the second load and a decrease in the first load with the master logic controller, placing the second parallel module converter module and the third parallel module converter module in parallel with the power switching network, and reassigning the second parallel module converter module to the second load with the master logic controller.

Embodiments of the present disclosure can also comprise a system comprising a master logic controller to receive a first load request and a second load request from a vehicle controller, a control switching network, comprising a plurality of control algorithms, in communication with the master logic controller, a plurality of inverters in communication with the control switching network for converting one or more direct current (DC) input signals to one or more AC output signals, and a power switching network, comprising a plurality of switches to connect the plurality of inverters to one or more electrical loads. In some embodiments, the controller can activate a first group of the one or more switches in the power switching network to connect a first group of the one or more inverters to a first load in response to the first load request and can activate a second group of the one or more switches in the power switching network to connect a second group of the one or more inverters a second load in response to the second load request.

Embodiments of the present disclosure can also comprise a method of providing power comprising receiving a request at a master logic controller to power a first load from a first external aircraft system, determining the power to be provided to the first load with the master logic controller, determining a first plurality of parallel module converter module to be activated to power the first load with the master logic controller, determining a plurality of parameters of a first control algorithm for the first plurality of parallel module converter modules with a control switching network, instructing a power switching network to connect the first plurality of parallel module converter modules in parallel with the first load, and activating the first control algorithm to provide the first load to the external aircraft system.

The features, functions, and advantages that have been discussed can be achieved independently in various embodiments of the present disclosure or may be combined in yet other embodiments, further details of which can be seen with reference to the following description and drawings.

Figure 1:
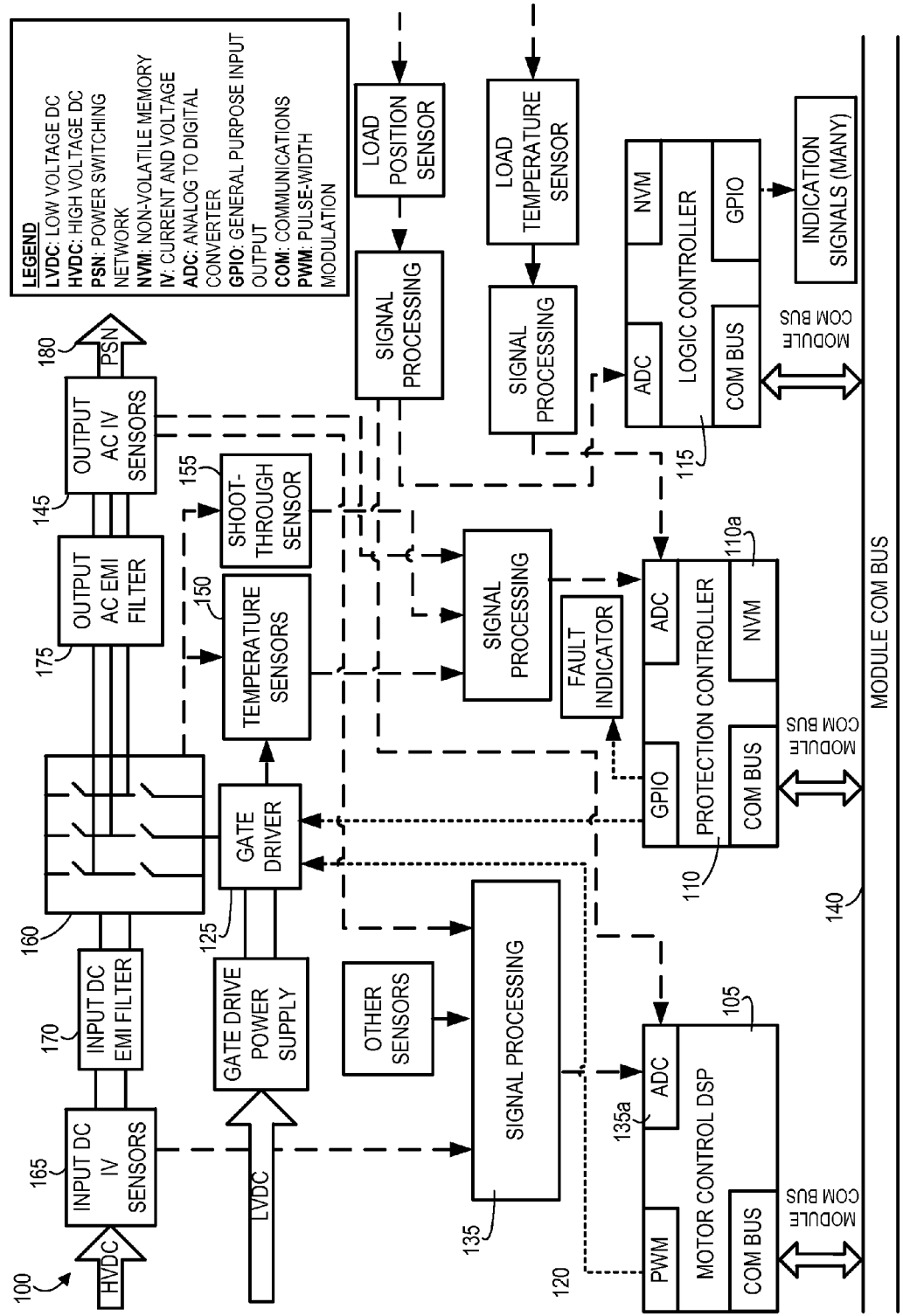
FIG. 1 is an electrical schematic depicting a parallel modular converter module ("module") for use in a parallel modular converter in a high voltage DC input application, in accordance with some embodiments of the present disclosure.

Each figure shown in this disclosure shows a variation of an aspect of the embodiment presented, and only differences will be discussed in detail.

DETAILED DESCRIPTION

Embodiments of the present disclosure relate generally to power distribution and power conversion systems and more particularly to a parallel modular converter for distributing electrical loads without the need for individual controllers at each electrical load. The converter can utilize a plurality of networked parallel modular converter modules, each rated with a predetermined power capacity. A master controller, in communication with aircraft systems and the modules, can receive requests from various power loads (e.g., electric motors) and can allocate one or more modules to meet the requested demand.

To simplify and clarify explanation, the disclosure is described herein as a system for allocating power on an aircraft. One skilled in the art will recognize, however, that the disclosure is not so limited. The system can also be used, for example and not limitation, with automobiles, other types of vehicles, and in power distribution networks. The disclosure can be used to improve control and reduce the cost and expense of distributing power in numerous situations by reducing the number of controllers required and eliminating excess controller capacity.

The materials and components described hereinafter as making up the various elements of the present disclosure are intended to be illustrative and not restrictive. Many suitable materials and components that would perform the same or a similar function as the materials and components described herein are intended to be embraced within the scope of the disclosure. Such other materials and components not described herein can include, but are not limited to, materials and components that are developed after the time of the development of the disclosure.

As mentioned above, a problem with conventional power distribution systems is that, generally, each electrical load is provided with an individual controller for power distribution purposes. Unfortunately, this leads to an excess of controller capacity because each individual controller must be rated for the maximum load that the requisite electrical appliance can draw. In addition, in most cases, the controllers are actually designed to provide some margin of safety even though (1) the electrical load itself (e.g., an electric motor) may have some inherent safety margin and (2) many electrical loads are generally used at less than full power and/or are only used intermittently.

To this end, embodiments of the present disclosure relate to a networked system of modular power controllers that can be used individually or in parallel to meet existing power demands. Because every electrical load in an aircraft will rarely, if ever, be on at the same time, the system can be designed with a capacity more closely related to nominal or average power consumption (plus some safety margin) rather than "worst case scenario." As a result, the number of components required, component weight, size, and cost can be reduced, system efficiency can be improved, and improved system redundancy can be provided. In the event of a motor controller failure, for example, the system can be reconfigured to assign the load to a functioning motor controller, improving reliability. In addition, if the loads are such that the system is operating at full capacity, all loads can still be powered, albeit at a reduced capacity in some cases.

As shown in FIG. 1, a building block of the system can comprise a plurality of parallel modular converter modules ("modules") 100 that can be networked together to form a parallel modular converter ("converter"), discussed below. In some embodiments, as shown in FIG. 1, each module 100 can comprise onboard processing. In this configuration, the module 100 can comprise at least three processors: the Motor Control Digital Signal Processor ("DSP") 105, the protection processor 110, and the logic processor 115.

In some embodiments, therefore, the DSP 105 can generate, for example, a high-frequency gate drive pulse width modulation signal (PWM) 120 to activate the gate driver 125. The gate driver 125 acts essentially as the switching side of the power module 100, much like an electrical relay. In other words, the output 180 of the module 100 is regulated by the PWM signal 120. To determine the proper PWM signal 120, the DSP 105 can utilize signals from various sensors via a signal processor 135 and/or signals via a module communications bus 140, discussed below.

In some embodiments, the DSP 105 can utilize sensors including, for example and not limitation, temperature sensors 150 and shoot-through sensors 155 to detect potentially damaging conditions. In other embodiments, the DSP 105 can utilize sensors including current sensors (to detect overcurrent conditions), voltage sensors (to detect overvoltage conditions), motor speed and position sensors (to detect over-speed conditions). In addition, many of these sensors (e.g., current, voltage, rotor speed and position sensors can also be used to perform motor control). In some embodiments, the signal processor 135 can condition signals from the sensors and can include an Analog to Digital Converter (ADC) 135a. In other embodiments, the ADC 135 can be a discrete unit that connects via a communications interface to the processors 105, 110, 115. In still other embodiments, the ADC 135 can be integrated into one or more of the processors 105, 110, 115.

Sensor data can comprise, for example and not limitation, module input and output current and voltage, motor position, DC link DM (differential mode) and CM (common mode), voltage and current, motor speed, and power module temperature. In some embodiments, the DSP 105 pulse width modulation method and output power level can be configured by the logic processor 115. To enable communication between module processors 105, 110, 115 and controllers external to the module 100, a module communications bus 140 can be utilized. In some embodiments, to enhance module 100 debugging and verification, for example, load sensor signals and DSP configurations can comprise datasets to be transmitted to a master data logger 310, as discussed below.

It is preferable, and sometimes required, to synchronize the reference clocks between the modules 100 and the motor control DSP 105 to generate synchronous output waveforms 180. Failure to synchronize reference clocks can result in the motor control DSP 105 generating waveforms that are out-of-phase from the waveforms of other modules 100. This, in turn, can potentially create short circuits, which can damage or destroy the modules 100. Variances in the high-frequency system clock of the DSP 105 are relatively insignificant; however, as a few nanoseconds will have little, or no, effect on the output waveforms. The reference clocks are preferably at least synchronized between parallel modules 100 (i.e., modules 100 that are currently feeding power to the same load). In some embodiments, for very accurate synchronization, methods known in the art such as, for example, synchronization via fiber optic cables can be used. Fiber optic can be advantageous because it is immune to the EMI noise generated by the power module switching.

In some embodiments, the protection processor 110 can enable safe operation of the module 100. The protection processor 110 can monitor various sensors for unsafe operating conditions including, but not limited to, output AC current and voltage sensors 145, gate driver and inverter temperatures 150, and shoot-through voltage 155. In some embodiments, the protection processor 110 can also monitor, for example, motor over-speed, over-voltage (DC link), overcurrent at input or output, over-voltage at input and output, CM (common mode) current, excessive voltage ripple, unbalanced input/output current, open phase, and computer failure protection (e.g., if the DSP fails, the protection processor 110 can disable the gate driver 125 independently). In still other embodiments, the protection processor 110 can also compare actual PWM configuration to the commanded PWM configuration. If these signals do not match, the gate driver 125 can also be disabled. In some embodiments, the protection processor 110 can be directly connected to the gate driver 125 enabling nearly instantaneous shutdowns of the inverter 160 should a fault be detected.

Module 100 input fault protection can also be provided by the protection processor 110 in communication with a master protection controller 305 over the module communications bus 140. Should the protection processor 110 detect a fault, for example, the protection processor 110 can instruct the master protection controller 305 to externally disable the module 100. In some embodiments, module 100 faults can also be recorded by the protection processor 110. In some embodiments, the fault can be stored in the memory 110a (e.g., non-volatile memory) of the protection processor 110 and the module 100 can be disabled until it can be repaired or replaced. To aid in debugging, in some embodiments, the protection processor 110 can also log some or all events with the master data logger 310. In this manner, information regarding module faults, communications, master logic commands and other pertinent information can comprise datasets for logging by the master data logger 310.

In some embodiments, the logic processor 115 can regulate the DSP 105 by configuring the modulation method and output power. Coordination between logic processors 115 in parallel modules 100 can enable equal load sharing and clock synchronization. As a result, each logic processor 115 can communicate with the master logic controller 320 for instructions on which load it is assigned to power at present.

As shown, the module 100 can accept a high-voltage DC power (HVDC) that has been rectified by an external rectifier unit. In some embodiments, the input current and voltage can be monitored by current and voltage sensors 165. The DC waveforms can be filtered by a DC electromagnetic inference (EMI) filter 170, which can reduce noise on the DC bus and stabilize input current and voltage. The inverter module 160 can then generate AC waveforms, which can be filtered by an output AC EMI filter 175, for use by the system loads. In some embodiments, additional filters and processors can be used to remove switching transients and smooth the output waveform. In some embodiments, each module 100 can comprise one small input EMI filter 170, for example, and a larger output EMI filter 175 for each load (connecting EMI filters in series improves filter attenuation).

Current and voltage waveforms can also be monitored by additional sensors after the output AC EMI Filter 145. In some embodiments, one or more voltage and/or current sensors at the module 100 and one or more voltage and/or current sensors on the load side. This can enable fault detection in the power switching network 325, discussed below.

Figure 2:
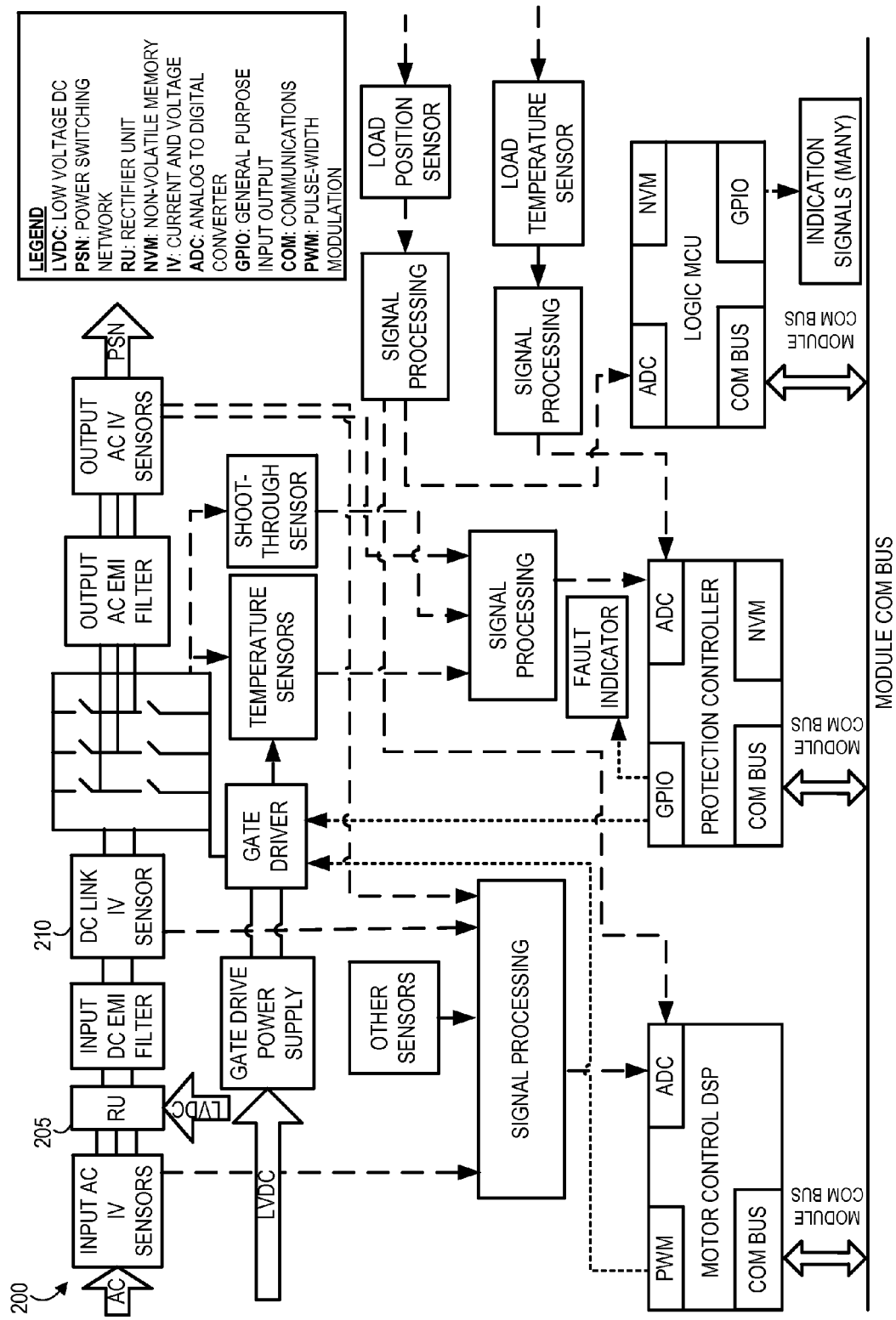
FIG. 2 is an electrical schematic depicting a module for use in a parallel modular converter in an AC input application, in accordance with some embodiments of the present disclosure.

As shown in FIG. 2, in some embodiments, rather than using an external rectifier, a rectifier 205 can be integrated into the module 200. In this configuration, the module 200 can utilize an AC power input, such as a 3-Phase AC power input. The rectifier 205 can comprise, for example and not limitation, an active front end (comprising solid state switches) or traditional passive rectifiers (e.g., multi-pulse autotransformer rectifier units, transformer rectifier units, or diode rectifiers). This configuration can provide increased reliability because, for example, a rectifier 205 failure affects only one module 200. In addition, reliability and safety are improved because there is also a decreased circulating current between modules 200 (i.e., as each module 200 can be isolated from other modules 200). Of course, this approach incurs a slight increase in cost, weight, volume, and complexity of the modules 200 as the result of the additional components 205, 210. In some embodiments, additional current and voltage sensors 210 can be used after the rectifier 205 to sense fault conditions.

Figure 3A:
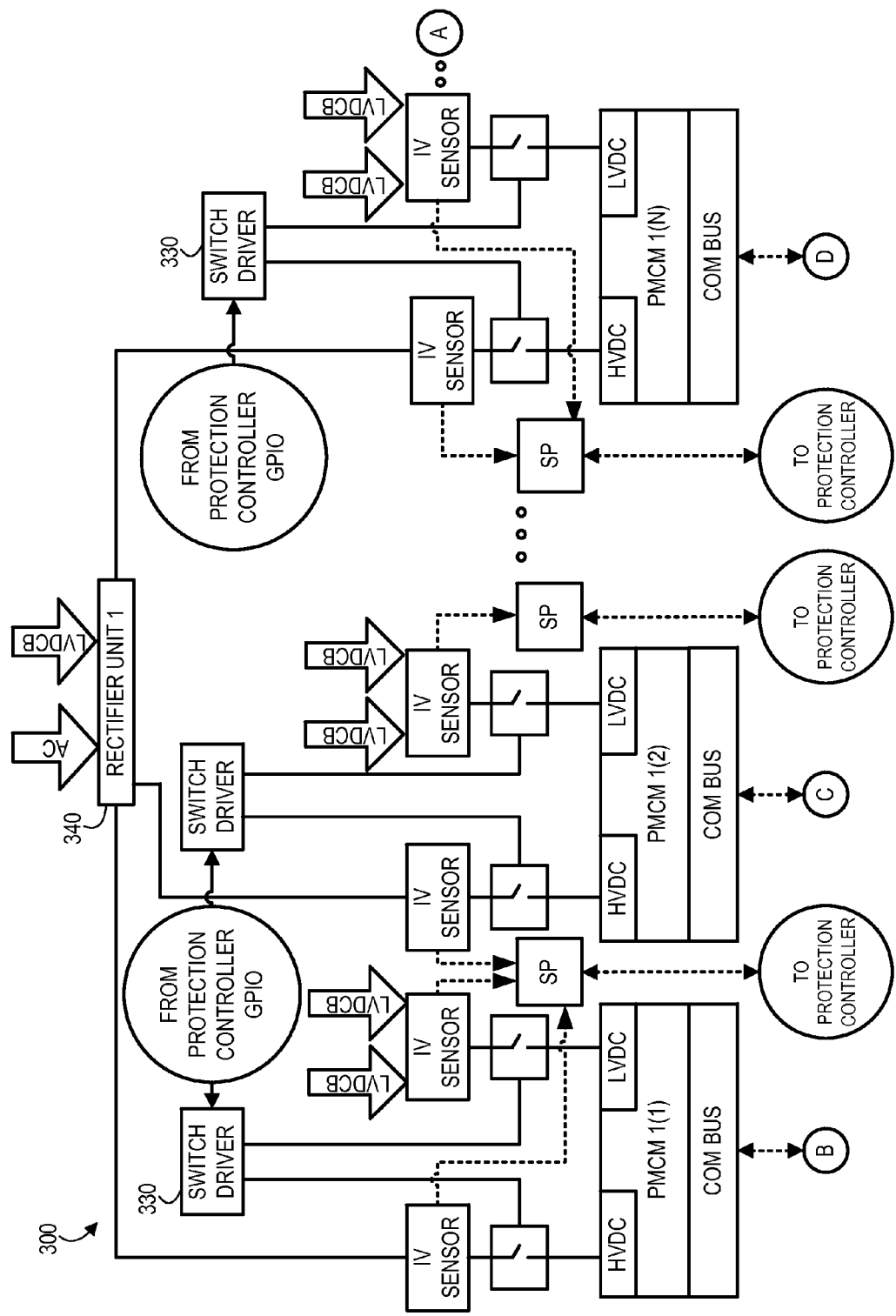
FIGS. 3A-3C are electrical schematics depicting a parallel module converter ("converter") using multiple modules in a high voltage DC current regime, in accordance with some embodiments of the present disclosure.
Figure 3B:
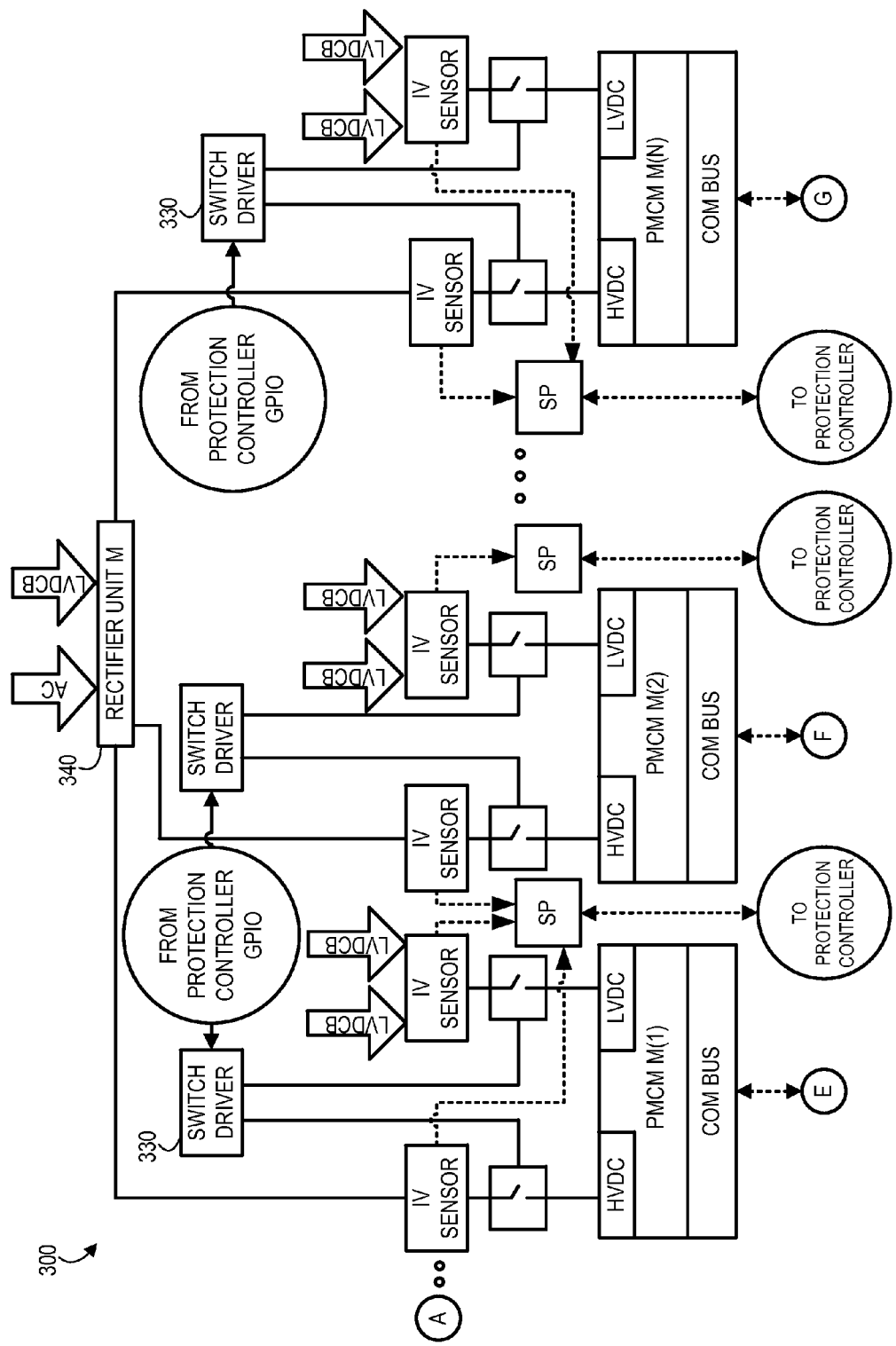
Figure 3C:
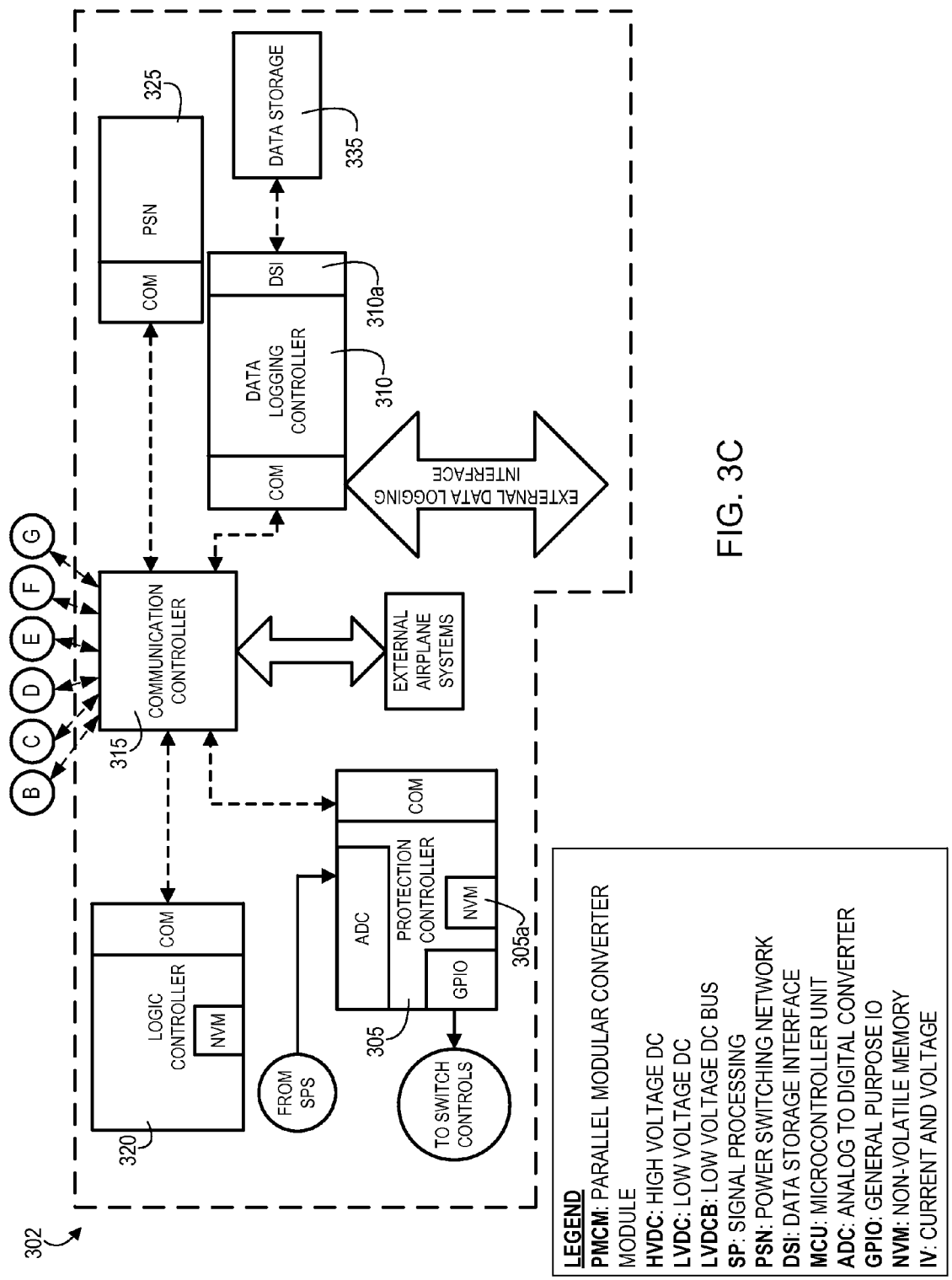

FIGS. 3A-3C depict an overall system 300 architecture for a converter. The master controller 302 can comprise, for example and not limitation, a master communications controller 315, a master logic controller 320, a master protection controller 305, a master data logger 310, and a power switching network 325. The master communications controller 315 can connect each module, via each module's 100 module communications bus 140, enabling message exchanges between modules 100. In addition, messages from the master logic controller 320 can also be routed by the master communications controller 315 to their respective destinations (e.g., to modules 100, external aircraft systems 350, etc.).

In some embodiments, to aid debugging, messages processed by the master communications controller 315 can be duplicated and transmitted to the master data logger 310 where they are recorded for concurrent or future analysis. In some embodiments, the master communications controller 315 can facilitate communications between the modules 100 and external aircraft systems 350 (e.g., aircraft systems 350 external to the system 300 requesting power). In some embodiments, the master logic controller 320 can receive requests for loads at a specified power level (i.e., current and/or voltage) from external airplane systems. The master logic controller 320 can then allocate modules 100 to fulfill power requests by selecting and configuring the modules 100 and power switching network 325 accordingly.

To ensure that any fault conditions occurring in the system 300 are detected and interrupted, the master protection controller 305 can monitor the inputs and outputs to each module 100 including, for example and not limitation, the input current and voltage waveforms of the high-voltage DC Bus and the low-voltage DC Bus. In some embodiments, should a fault occur, the master protection controller 305 can signal the corresponding power switch 330 to disconnect the module 100, record the failure in the master protection controller memory 305a, and send a message of the failure to the master data logger 310. The master protection controller 305 can disable the module 100 until it has been, for example, repaired or replaced.

Logging of control messages and sensor readings, on the other hand, can be handled by the master data logger 310. The master data logger 310 can record the data it receives to a data storage medium 335, which can be in communication via the data storage interface 310a. In some embodiments, such as when high-frequency sensor readings are to be written to the data storage, high-speed high-capacity storage devices can be used. In some embodiments, the reliability of the system 300 can be enhanced using redundant low-voltage DC connections to the master controllers (e.g., the master protection controller 305, master data logger 310, master communications controller 315, and master logic controller 320) and the module's 100 processors (e.g., the motor control DSP 105, protection processor 110, and logic processor 115).

In this configuration, the modules 100 can be powered through rectifier units (rectifiers) 340 external to the modules 100. Each rectifier 340 can power N (any number of) modules 100. Of course, decreasing the number, N, powered by each rectifier 340 can increase reliability, at the expense of increased weight and complexity. As a result, if there are M rectifiers 340, for example, this would result in a total of N*M modules 100. As above, the rectifier 340 can be, for example and not limitation, an AFE, passive diode, or multi-pulse autotransformer unit rectifiers.

Figure 4:
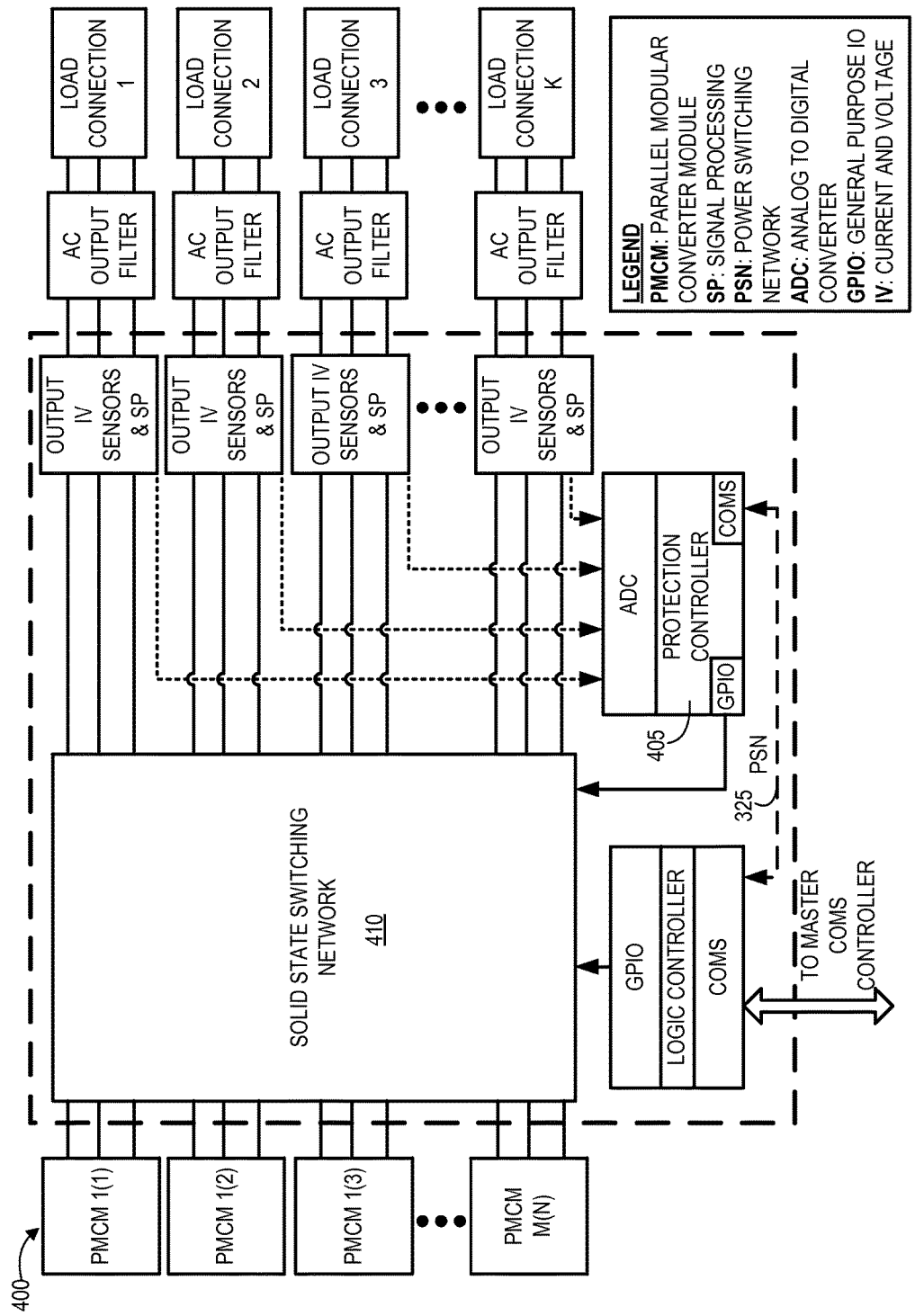
FIG. 4 is an electrical schematic depicting an output configuration, in accordance with some embodiments of the present disclosure.

In some embodiments, as shown in FIG. 4, the output system 400 can include the power switching network 325. The power switching network 325 can switch the module 100 outputs to their assigned load. Load fault identification and interruption can be provided by the monitoring of current and voltage waveforms by the power switching network protection controller 405. Should the power switching network protection controller 405 detect fault conditions, it can open some or all power switching network 325 switches 410 connected to the load. In some embodiments, the power switching network protection controller 405 can also record the fault in NVM to aid with either reclosing the switch 410 (i.e., when the fault has been corrected) or permanently disconnecting a switch 410 (e.g., until it is replaced). The power switching network protection controller 405 can also inform the power switching network 325 of the fault. The power switching network 325 can then open all switches connected to the load, thereby providing redundant system protection. In some embodiments, the output of the system 300 can include a final stage of EMI attenuation, if required. Each load can have one or more dedicated AC Output EMI filters that can filter the combined waveforms from all parallel modules 100. In some embodiments, the switches 410 can be, for example and not limitation, solid state switches or electromechanical contactors.

Figure 5:
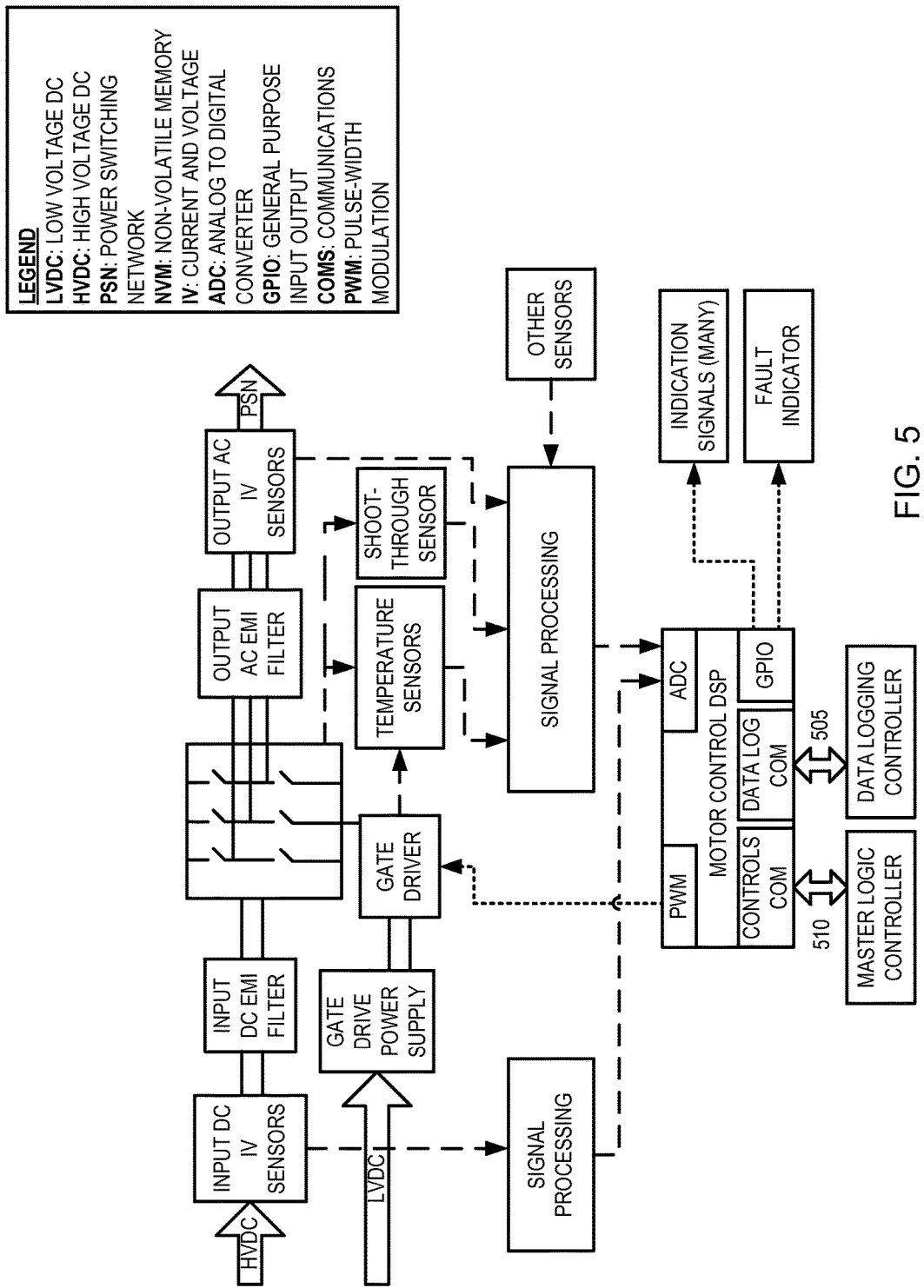
FIG. 5 is an electrical schematic depicting an alternative module with shared controllers in a high voltage DC input application, in accordance with some embodiments of the present disclosure.

In some embodiments, as shown in FIG. 5, rather than multiple module controllers (e.g., the motor control DSP 105, protection processor 110, and logic processor 115), the modules 100 can be primarily controlled by the motor control DSP 105. In this configuration, transferring the logic processor 115 functions to the master logic controller 320 can reduce the number of processors required by the module 100. In some embodiments, this can also eliminate, for example, the power distribution negotiation process between each module's logic processor 115. In this configuration, the motor control DSP 105 can be configured by the master logic controller 320. Load sensor signals can be transmitted by the master logic controller 320 to the motor control DSP 105, as required. In addition, system 300 reference clock synchronization to generate synchronous waveforms can still be provided by the motor control DSP 105.

In this configuration, the protection processor 110 functions can be integrated into the reference clock synchronization to generate synchronous waveforms. In most cases, processing the relatively small number of additional signals does not add significant burden to the motor control DSP 105. Should the motor control DSP 105 identify fault conditions, the motor control DSP 105 can disable the module 100 simply by stopping the PWM signal 120.

In some embodiments, to reduce the bandwidth requirements of the module communications bus 140, the modules 100 can also comprise a separate data-logging communications bus 505. In this manner, the relatively high-bandwidth data-logging communications can be handled by the data-logging communications bus 505, while the controls communications 510, which are relatively low-bandwidth, high reliability communications, can remain on the module communications bus 140. In this manner, the motor control DSP 105 can be connected to both communications buses 505, 510 enabling both types of communications.

Figure 6A:
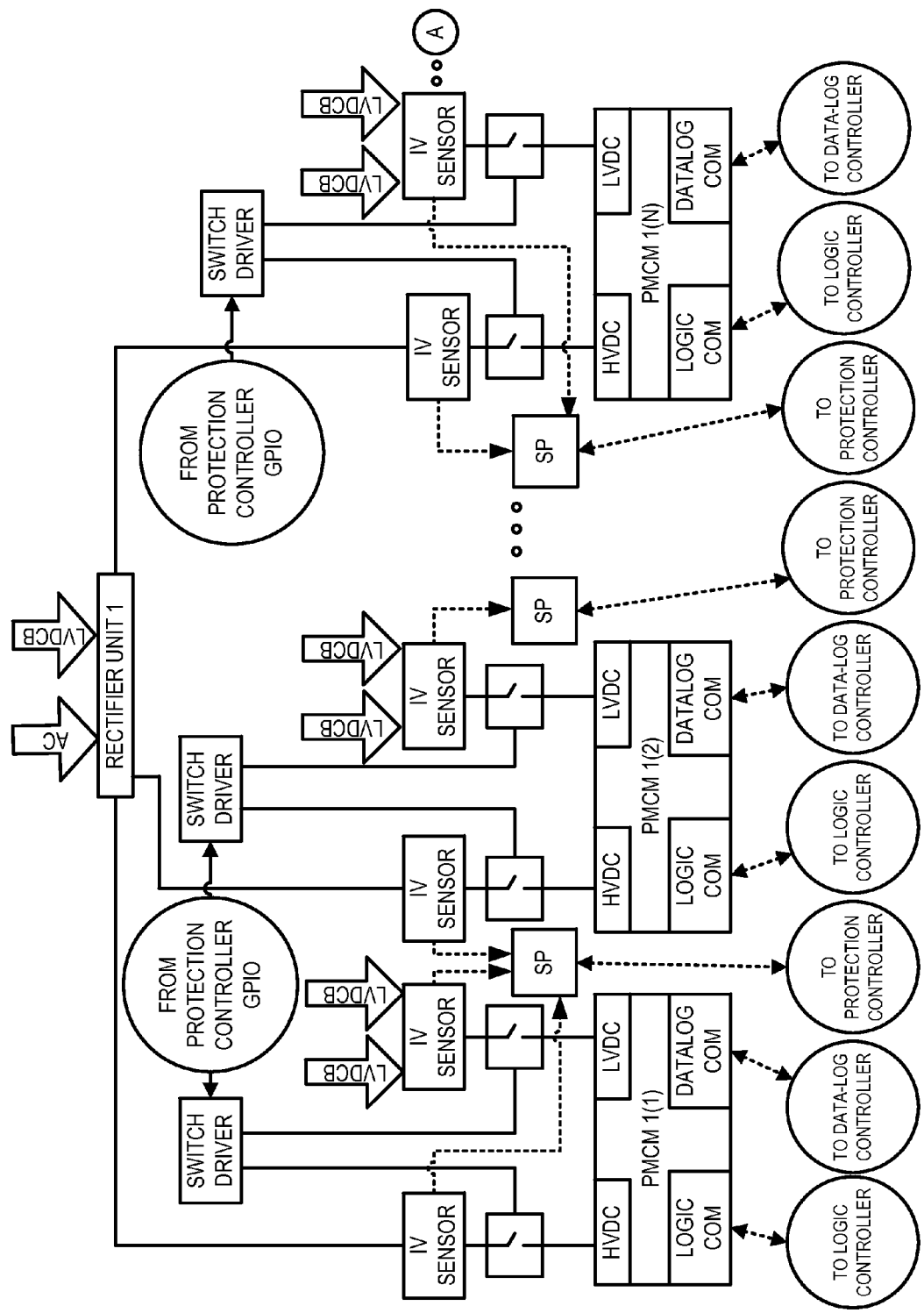
FIGS. 6A-6C are electrical schematics depicting an alternative converter in a high voltage DC input application, in accordance with some embodiments of the present disclosure.
Figure 6B:
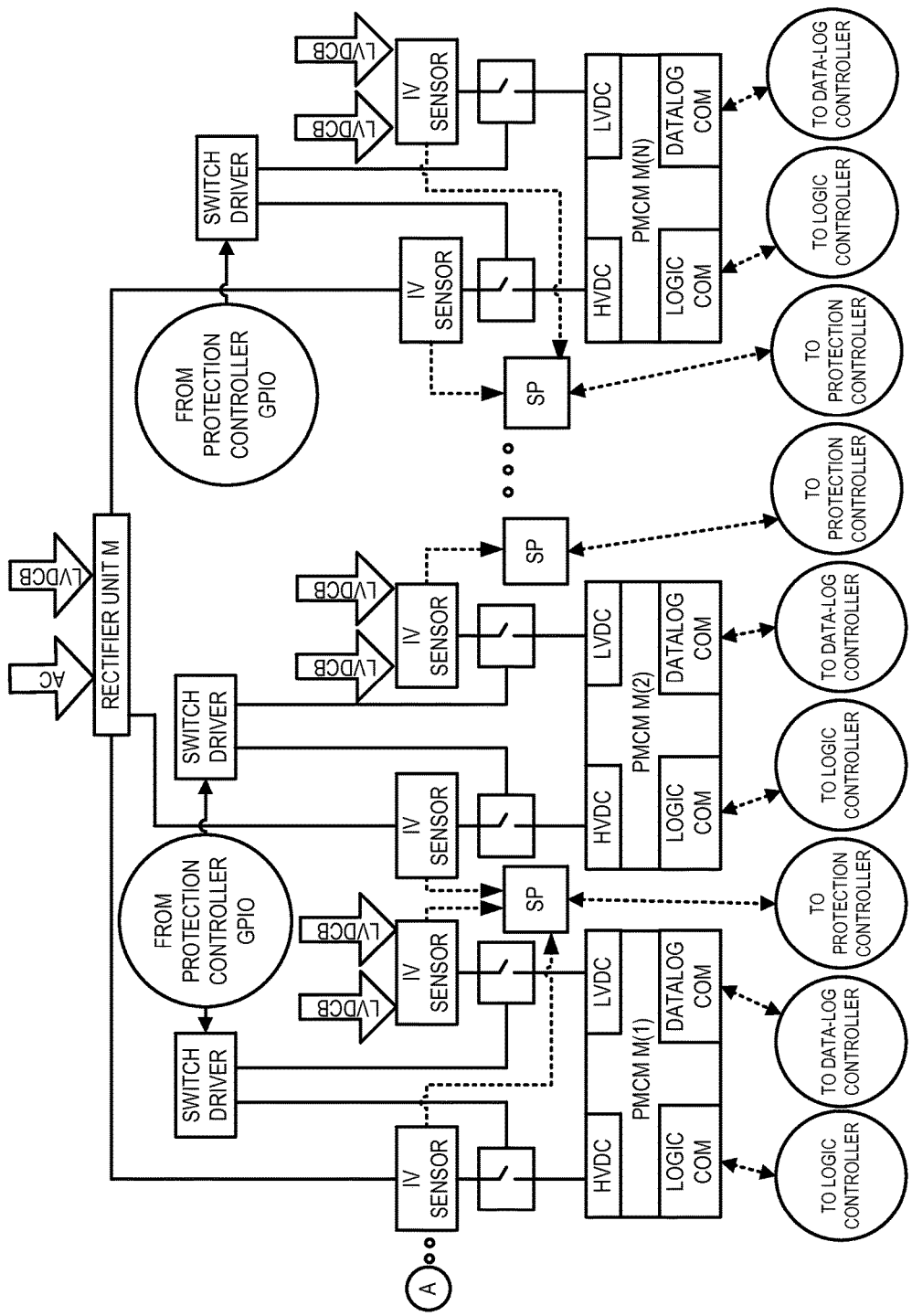
Figure 6C:
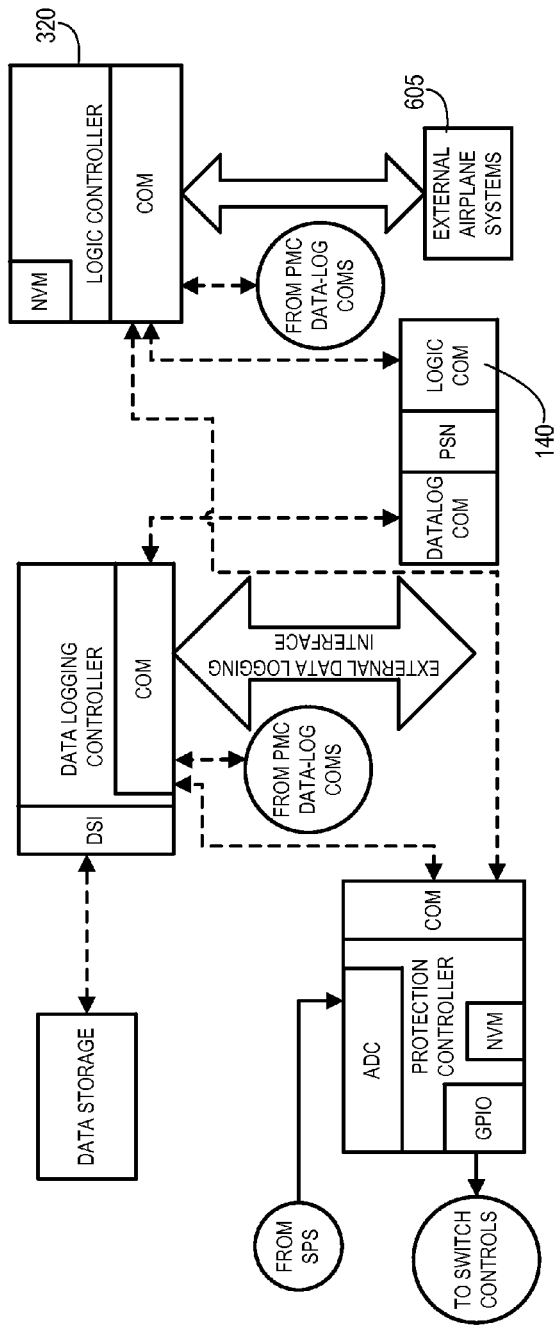

In still other embodiments, as shown in FIGS. 6A-6C, the system 600 can comprise a more prominent master logic controllers 320 and master data loggers 310, enabling the elimination of the master communications controller 315. In this configuration, the master logic controller 320 can connect to every module's logic communications bus to enable configurations to be transmitted to the modules 100. Power distribution between parallel modules 100 and communication with external aircraft systems 605 (i.e., aircraft systems external the system 600, not the aircraft) can be controlled by the master logic controller 320. The master data logger 310 can connect to each module's data-logging communications bus 505 enabling higher frequency data logging. In some embodiments, additional connections can be made to the master protection controller 305 and/or the master logic controller 320 for data storage, while the master protection controller 305 can operate substantially, as discussed above.

Figure 7:
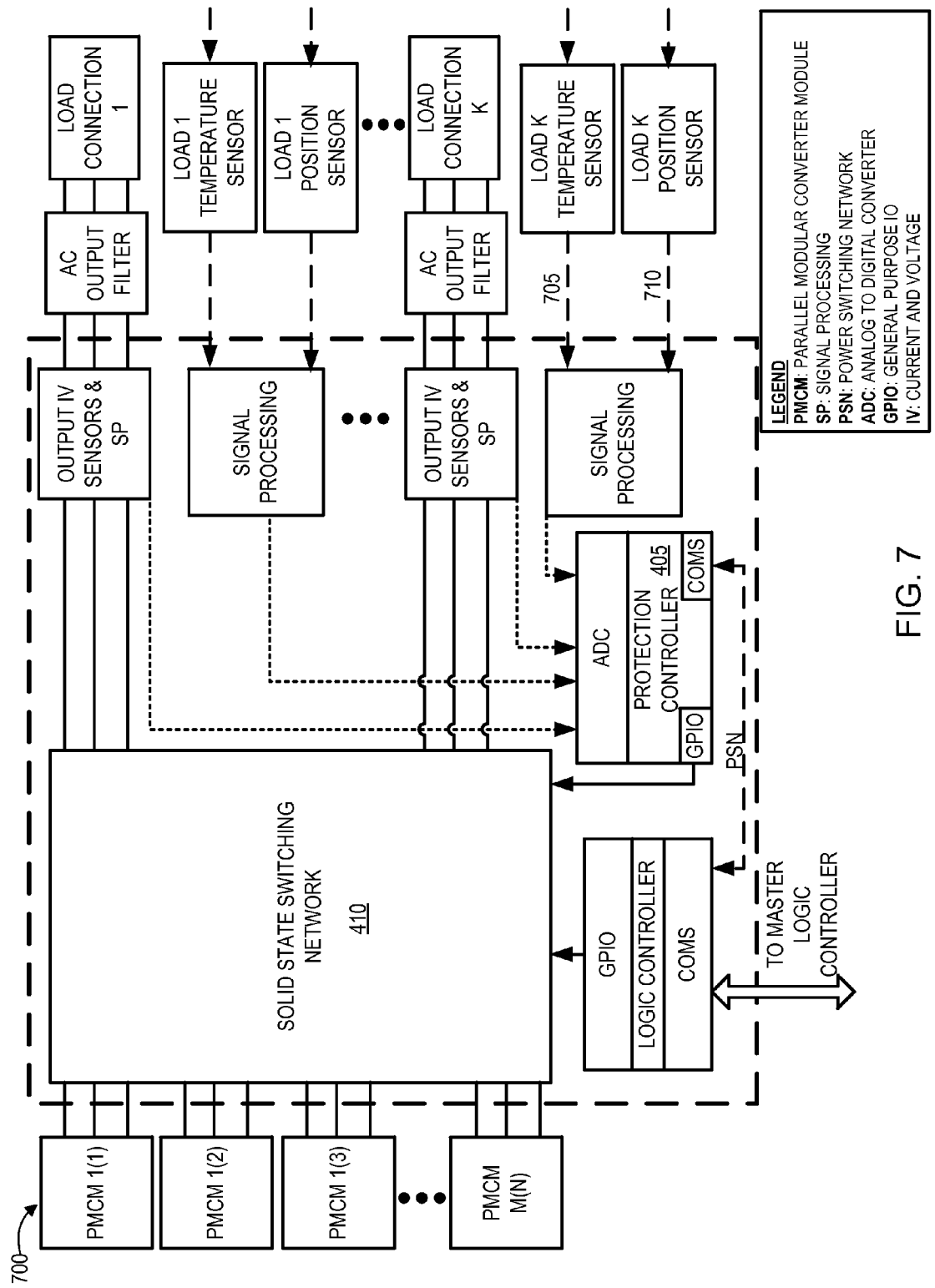
FIG. 7 is an electrical schematic depicting a power switching network, in accordance with some embodiments of the present disclosure.

In some embodiments, as shown in FIG. 7, the system 700 can comprise load sensor signal processing that has been relocated from the individual modules 100 to the system 300 output. In this configuration, the power switching network protection controller 405 can monitor load signals ensuring no faults occur (e.g., over-temperature or over-speed conditions). The power switching network protection controller 405 can relay sensor data including, but not limited to, load temperature 705 and load position 710, to the master logic controller 320 for distribution to the modules 100.

Figure 8:
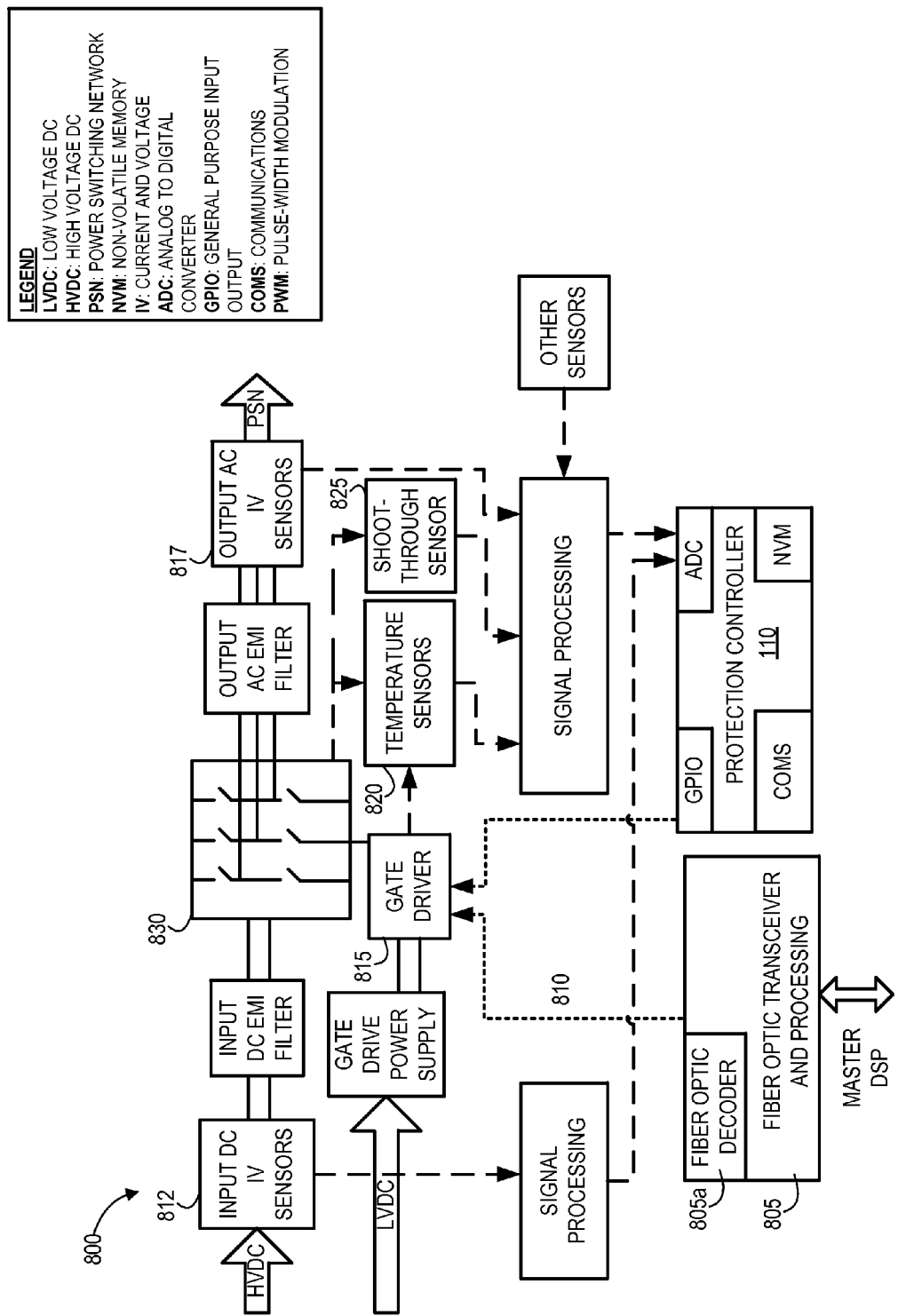
FIG. 8 is an electrical schematic depicting a power switching network, in accordance with some embodiments of the present disclosure.

FIG. 8 depicts an alternative module 800 architecture that eliminates reference synchronization issues (i.e., the synchronization of reference clocks between the modules 100, discussed above). In some embodiments, this can be achieved by relocating the motor controller DSP 105 to the Master Control 302. As mentioned above, the motor controller DSP 105 computes PWM states and then transmits them (e.g., via switch state messages over fiber optics) to the module 800. Fiber optics can be used for intermodule communication, for example, to prevent data corruption on unshielded electrical wires. In this configuration, a fiber optic transceiver 805 can receive the switch state messages.

A decoder 805a within the fiber optic transceiver 805 can then generate an analog gate drive signal 810 for the gate driver 815. The fiber optic transceiver 805 can transmit, receive, encode, and decode signals from electrical domain to optical and vice versa. Fiber optics signals can be advantageous because optical signals are immune to the EMI noise generated by the power switching network. Optical media can be useful, therefore, to transmit information over relatively long distances (e.g., between modules 100).

The decoder 805a can be a logic circuit such as, for example and not limitation, a field programmable gate array (FPGA), complex programmable logic device (CPLD), application specific integrated circuit (ASIC), or processor. The protection processor 110 can provide basic protection by monitoring the current and voltage sensors 812,817 for the DC input and the AC output, respectively, the temperature of module devices 820, and inverter shoot-through 825, among other things. Should a fault occur, the protection processor 110 can disable the inverter 830 and inform the master protection controller 305 of the fault. In some embodiments, the protection processor 110 can communicate with the master protection controller 305 via the fiber optic transceiver 805. In other embodiments, the protection processor 110 can communicate with the master protection controller 305 via the module communications bus 140. In some embodiments, switch state messages and protection messages can be transmitted at different frequencies to enable concurrent communication.

Figure 9A:
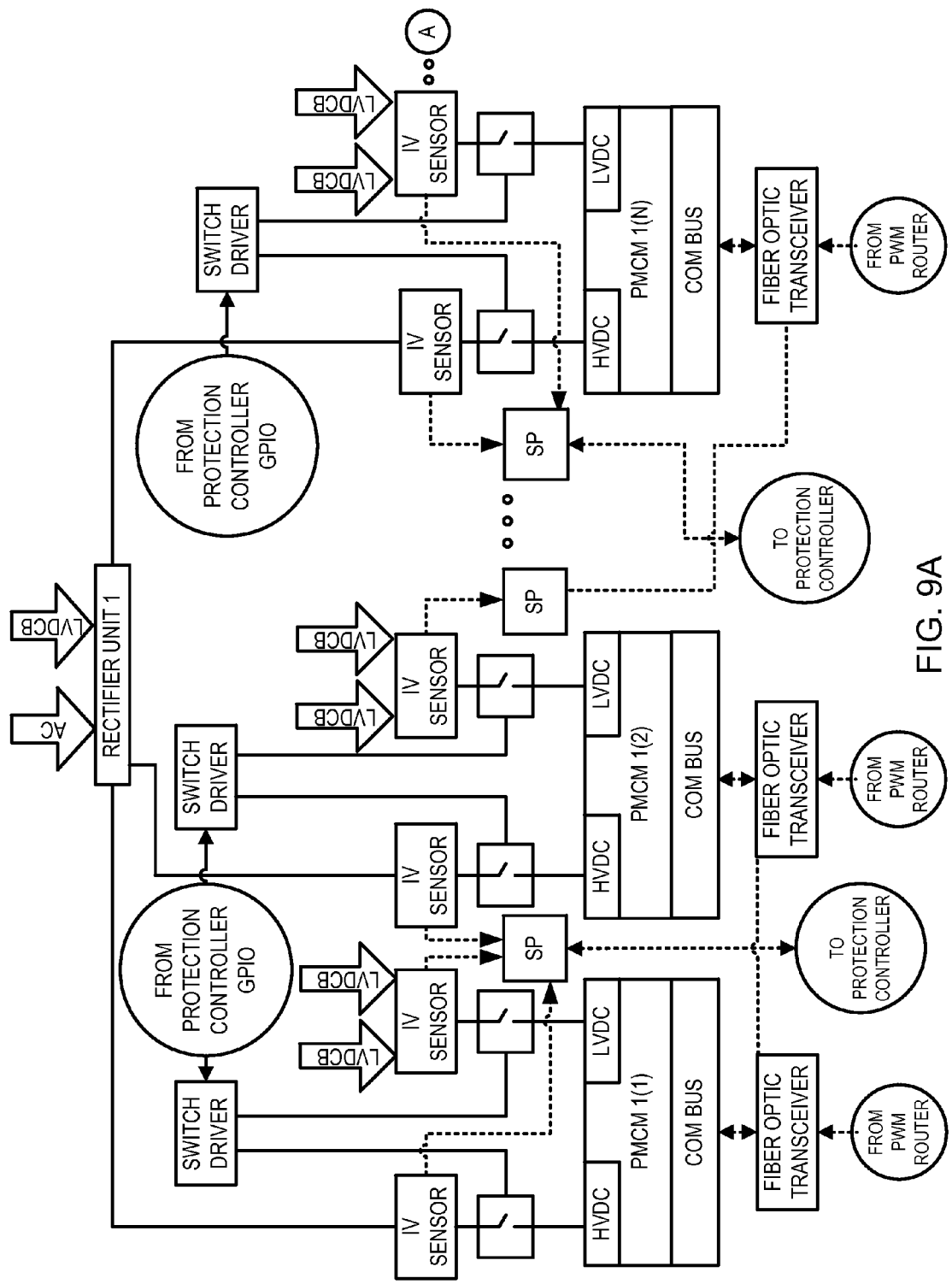
FIGS. 9A-9C are electrical schematics depicting an alternative converter, in accordance with some embodiments of the present disclosure.
Figure 9B:
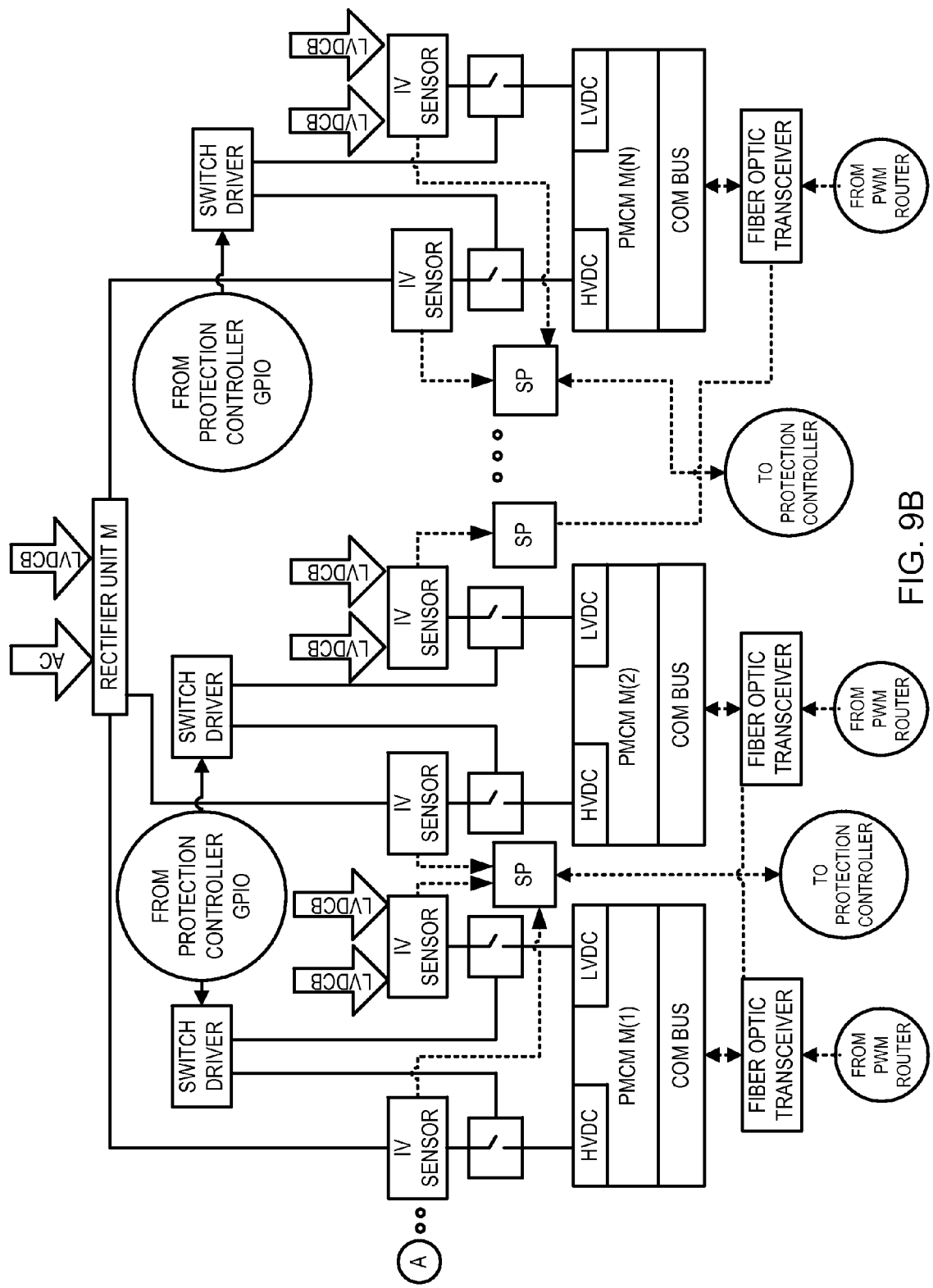
Figure 9C:
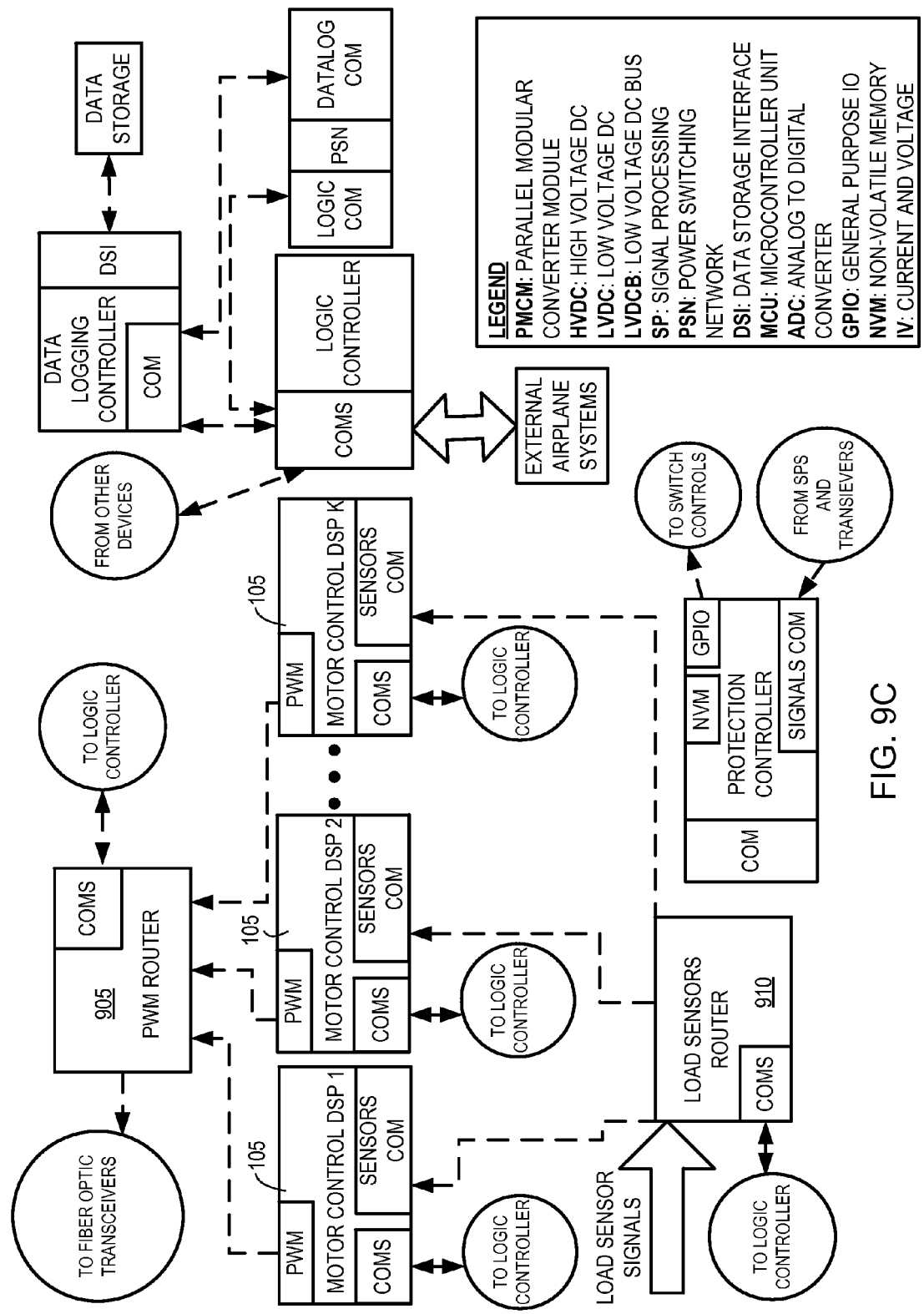

In yet other embodiments, as shown in FIGS. 9A-9C, the motor controller DSPs 105 can be relocated from the module 100 to the master controller 302. By consolidating motor controller DSPs 105, clock synchronization is less difficult due to the close proximity of the devices (i.e., most of the time delay element is removed from the synchronization). In some embodiments, the motor controller DSPs 105 can be placed on a modular accessory board to facilitate repairs of the system 900. The number of motor controller DSPs 105 can be equal to the maximum number of simultaneous loads, K, to be controlled by the system 900. In this configuration, each motor controller DSP 105 can calculate the PWM state then transmit a switch state message to the modules 100, with parallel modules 100 receiving switch state messages from the same motor controller DSPs 105. In some embodiments, a PWM router 905 can be used to route the switch state messages to parallel modules 100. Sensor signals such as, for example, load currents and voltages, can be routed to the respective motor controller DSPs 105 by a load sensors router 910.

In some embodiments, the master logic controller 320 can communicate directly with each motor controller DSPs 105 to configure the necessary control variables (e.g., pulse width and magnitude). In some embodiments, as above, fiber optic transceivers 805 can be used to communicate with the modules 100. Multiple wavelengths/frequencies can also be used to enable the concurrent transmission and/or reception of switch state messages and module fault messages.

The architecture discussed above can provide high reliability because each module's 100 controllers operate nearly independently. In most cases, interaction with other controllers is limited to the allocation of power distribution between the logic processors 115 of various modules 100 and the distribution of load and power by the master logic controller 320. In this configuration, for example, a module 100 failure will not affect the operation of other modules 100. In addition, communication is simplified as the module communications bus 140 provides and interface between the various module processors (e.g. the DSP 105, the protection processor 110, and the logic processor 115) and the master controllers. However this architecture can be somewhat less cost effective and more difficult to implement. Utilization of a dedicated logic controller for minimal tasks, for example, can result in unused processing power increasing module costs. Integration of logic controller functions into other controllers such as the master logic controller 320, on the other hand, would decrease costs and module complexity. Implementation of synchronized reference clocks can add complexity and cost to the module.

Figure 10:
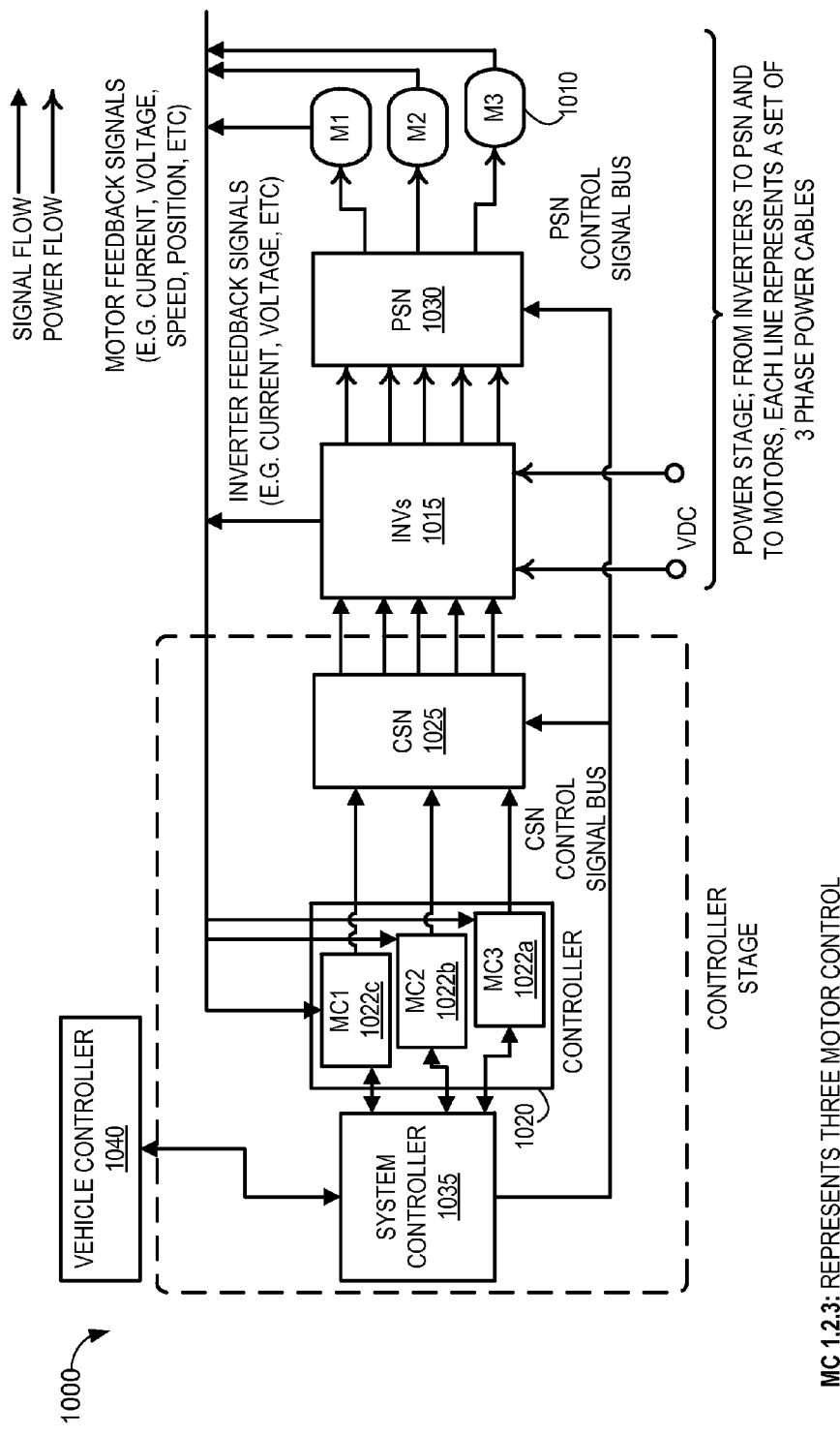
FIG. 10 is an electrical schematic depicting an overall system architecture for the converter, in accordance with some embodiments of the present disclosure.
Figure 11:
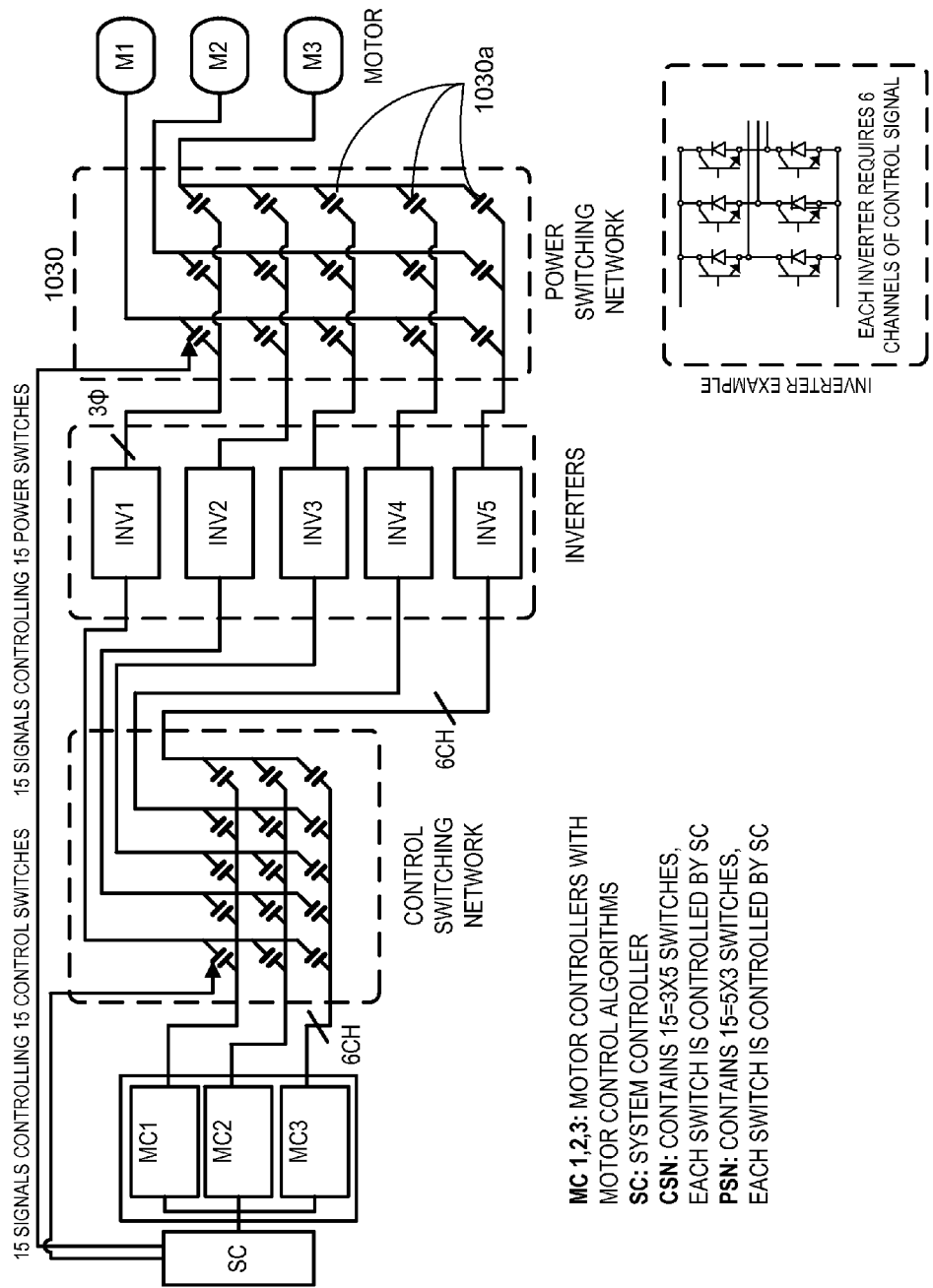
FIG. 11 is a detailed electrical schematic depicting a control switching network and a power switching network of FIG. 10, in accordance with some embodiments of the present disclosure.

The overall system architecture, including the subsystems discussed in FIGS. 1-9C, is shown in FIGS. 10 and 11, the system 1000 can control a system of parallel modular inverters 1015 to drive multiple and/or different types of AC or DC machines 1010. The system 1000 can comprise a plurality of parallel modular inverters 1015 connected in parallel, each of which is able to be configured to receive any of a plurality control algorithms 1022*a*, 1022*b*, 1022*c* embedded in a control system 1020 via a reconfigurable control switching network 1025. Each of the parallel modular inverters 1015 can be configured to drive one or more of the plurality of AC machines 1010 on the load side via a reconfigurable power switching network 1030.

This configuration enables, for example, the ability to dynamically reconfigure both the control switching network 1025 and power switching network 1030. In addition, any of the inverters from the plurality inverters 1015 in parallel is accessible to drive any motor of the plurality motors 1010 (or other electrical loads) on the load side and any control algorithm of a plurality control algorithms 1022 embedded in the system 1000 is accessible to control any of the plurality inverters 1015. As a result, one or more inverters 1015 can drive one motor 1010, as necessary to meet load requirements, and/or a plurality of motors 1010 on the load side can be driven at the same time, each of which can be driven with one or more inverters 1015. In addition, a plurality of motors 1010 on the load side can be driven at the same time with the same control algorithm (e.g., 1020*a*) or a different control algorithm (e.g., 1020*b*).

As shown in FIG. 10, the system can comprise a system controller 1035 configured to communicate with a vehicle controller 1040 to, for example, obtain operation commands from the vehicle controller 1040 and provide system 1000 status signals to the vehicle controller 1040, among other things. In some embodiments, the system controller 1035 can also reconfigure the power switching network 1030 to provide an appropriate number of inverter modules 1015 in parallel to drive a motor 1010 in real time. In other words, when the load from a motor 1010 is increased, the system controller 1035 can signal the power switching network 1030 to place more inverter modules 1015 in parallel. Conversely, of course, when motor load is decreased, the system controller 1035 can signal the power switching network 1030 to disengage one or more inverter modules 1015. If necessary, the system controller 1035 can then place them in parallel with other inverter modules 1015 to drive other loads 1010.

In some embodiments, the system controller 1035 can also reconfigure the control switching network 1025 to provide appropriate motor control algorithms 1022 to one or more of inverter modules 1015 driving one or more motor types. The system controller 1035 can provide algorithms related to, for example and not limitation, field oriented control (FOC), direct torque control (DTC), voltage over frequency Control (V/F). This can be useful, for example, to efficiently drive specific motor types (e.g., induction motors, synchronous motors, permanent magnet synchronous motors, brushless DC motors, etc.).

In some embodiments, the system controller 1035 can also send, for example and not limitation, motor speed, torque, or power reference values to corresponding motors 1010 (or motor controllers). In some embodiments, the system controller 1035 can be stored and run on an embedded controller. The system controller 1035 can comprise, for example and not limitation a microcontroller processor, FPGA, or ASIC. In some embodiments, the system controller 1035 can use a real time simulator/emulator or can be run in real-time.

In some embodiments, the number of motor controller algorithms 1022 can be determined by the number of different motor loads. If the system 1000 has three different types of motors 1010 to drive, for example, then three motor controller algorithms 1022 can be developed, with each motor control algorithm 1022 specific to the motor load. Of course, if all three motors 1010 perform the same function with the same motor, it is possible that all three loads can be powered using the same algorithm 1022.

The control switching network 1025 can dynamically configure one or more inverters 1015 each of which can be driven by a specific control algorithm 1022, or a common control algorithm 1022, which is routed through control switching network 1025 per commands from the system controller 1035. In some embodiments, time delay between signals into and out of control switching network 1025 can be minimized to improve motor drive performance.

The control switching network 1025 can be, for example, in a software or hardware implementation. In some embodiments, a software coded control switching network 1025 can be run on, for example and not limitation, an embedded controller, real-time simulator, or computer. In other embodiments, the control switching network 1025 can be implemented using a hardware device such as, for example and not limitation, CPLDs, ASICs, or FPGAs.

In some embodiments, the power switching network 1030 can dynamically configure one or more inverters to drive one or more motors per one or more specific control algorithms from the system controller 1035. In some embodiments, the power switching network 1030 can act as a short circuit and/or over current protection device. In this case, the power switches 1030*a* associated with the short-circuit or over-current load open when a fault is detected.

The power switching network 1030 can be implemented using, for example and not limitation, solid state relays, mechanical relays, transistors, and other controllable power switches. Of course, the inverters 1015 convert DC power to the requested AC power (e.g., at different voltage levels, frequencies, waveforms, etc.) to drive various AC machines (e.g., AC motors 1010) per the motor algorithm 1022 and system controller 1035. The inverters can comprise, for example and not limitation, insulated-gate bipolar transistors (IGBTs), metal-oxide-semiconductor field-effect transistors (MOSFETs), and bipolar junction transistors (BJTs).

In still other embodiments, the system 1000 can assign loads based on a load priority factor. In other words, if, for example, the number of loads requested by external aircraft systems 1040 (i.e., external to the system 1000) is larger than can be provided by the module 100, the system 1000 can assign loads by a load priority factor, with higher priority loads being powered before lower priority loads. If the aircraft 1040 makes a request for a large load, such as to lower the landing gear, for example, the system 1000 can temporarily reassign some or all of the modules 1015 to power the landing gear motors. When the landing gear is down and locked, in turn, the system 1000 can reassign the modules 1015 to their previous loads (or to now existing loads). So, for example, the cabin fan can be temporarily deactivated in favor of the landing gear and then restarted when the gear is down.

In some embodiments, such as when there are an excess of low priority loads that collectively exceed the power rating of the system 1000, the system 1000 may power some or all of the loads at a reduced setting. In this manner, all loads are powered, but may operate at a lower speed or capacity. So, for example, the aircraft cabin fans, lighting, and entertainment system may request power at the same time in excess of the system 1000 rating. As a result, the system 1000 can, for example, provide full power to the entertainment system, but slightly reduce cabin fan speeds and lighting intensity to reduce overall power demand.

Figure 12:
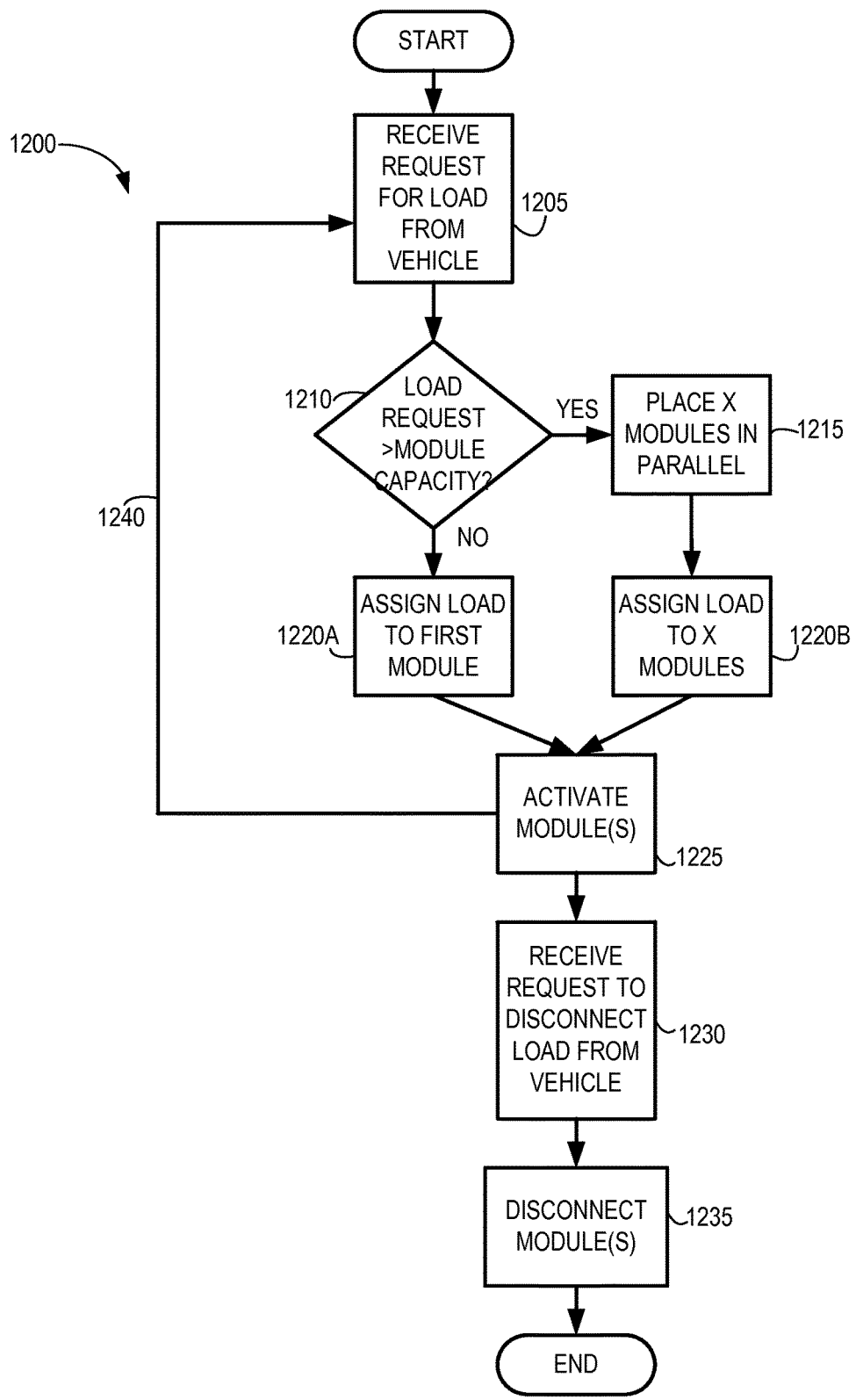
FIG. 12 is a flowchart depicting a method of distributing power, in accordance with some embodiments of the present disclosure.

As shown in FIG. 12, embodiments of the present disclosure can also comprise a method 1200 for distributing power. In some embodiments, the method 1200 can comprise receiving 1205 a load request from the vehicle (e.g., load requests from the vehicle controller 1040). The controller can then determine 1210 if the load requested is above or below the power rating for a single module. If the load request is below the rating for a single module, the controller can assign 1220*a* the load to a single module. If, on the other hand, the load is greater than a single module can power, the controller can parallel 1215 the number of modules ("X") together that are required to power the load and then assign 1220*b* the load to the X modules. The controller can then activate 1225 the modules providing the necessary load.

When the vehicle no longer needs the power supply (e.g., the landing gear is down), the vehicle can request 1230 that the load be disconnected and the controller can disconnect 1235 the module, or modules. In some embodiments, the system can also continuously or periodically check 1240 for current system requirements and reassign modules as required.

Example 1

In one example, each module 100 can have a 10 A rating. With ten modules 100 in a converter 300, therefore, the converter can provide 100 A. If the aircraft requests a 25 A load to power the hydraulic motors for the landing gear, for example, the system 300 can determine that the load requires at least three modules 100, place three modules 100 in parallel, and then assign and activate three modules 100 to the load. If, during the operation of the landing gear, for example, the power requirements change—e.g., the power required to start the motors is greater than the continuous power to run the motors—the system 300 can remove (or add) modules 100 as the load changes.

Figure 13:
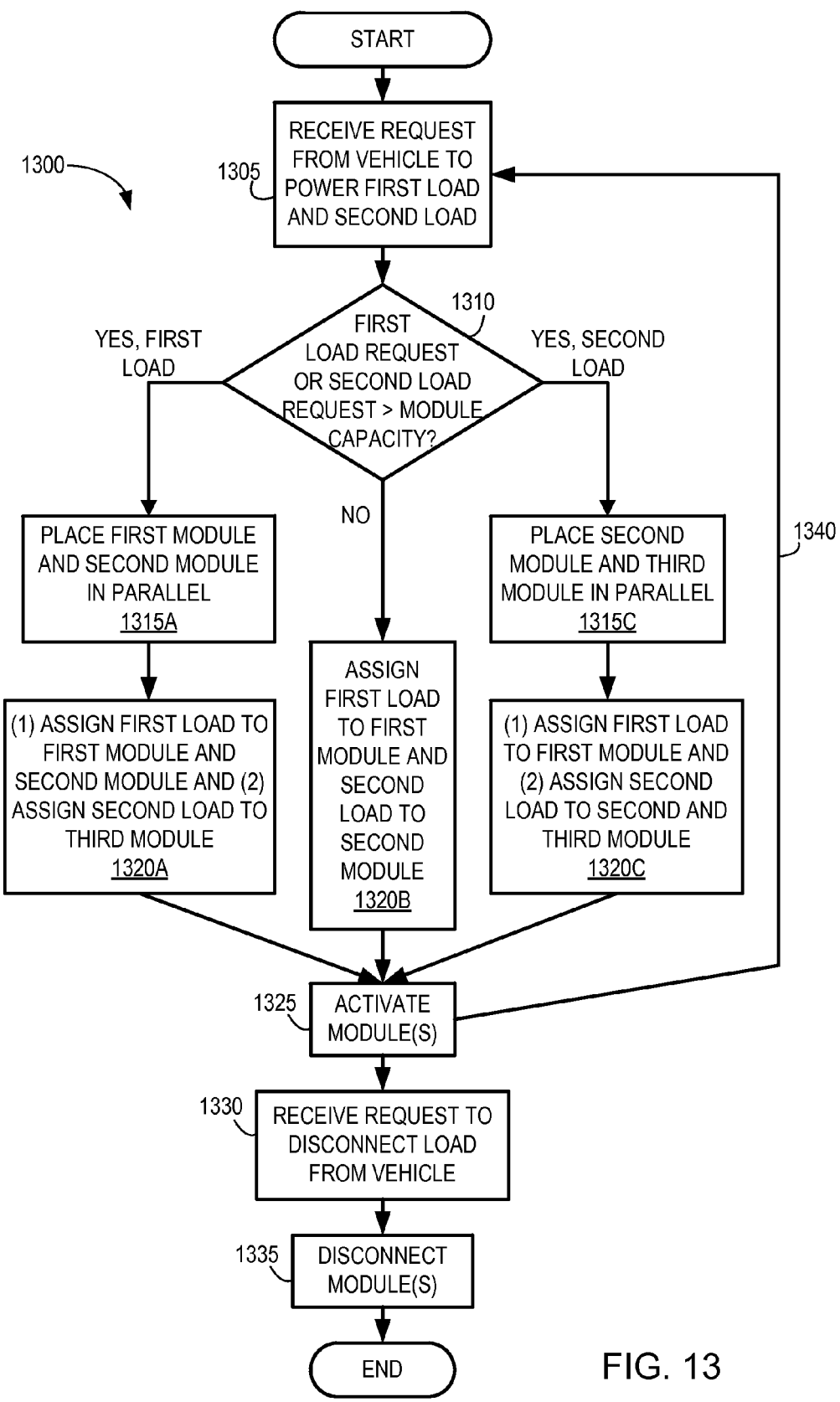
FIG. 13 is a flowchart depicting a method for reapportioning loads to a plurality of modules, in accordance with some embodiments of the present disclosure.

Similarly, as shown in FIG. 13, embodiments of the present disclosure can also comprise a method 1300 for distributing power for multiple loads. In some embodiments, the method 1300 can comprise receiving 1305 at least two load requests from the vehicle. The controller can then determine 1310 if the load requests are above or below the power rating for a single module. If the load requests are below the rating for a single module, the controller can assign 1320*b* each load to a single module. If, on the other hand, either (or both) load is greater than a single module can power, the controller can parallel 1315*a*, 1315*c* two or more modules together and then assign 1320*a*, 1320*c* the loads to the parallel modules, as required. The system can then activate 1325 the modules. In some embodiments, the system can also continuously or periodically check 1340 for current system requirements and reassign 1320 modules as required. When the vehicle no longer needs the power supply for one or both loads, the vehicle can request 1330 that the load be disconnected and the controller can disconnect 1335 the module, or modules for that load.

Example 2

In another example, as above, each module 100 can again have a 10 A rating and ten modules 100 in a converter 300 for a total of 100 A capacity. If the aircraft requests a first, 15 A, load to power the hydraulic motors for the landing gear, for example, and a second, 7.5 A, load to turn the cabin fan on low, the system 300 can determine that the load requires at least three modules 100. The system 300 can place a first module 100 and a second module 100 in parallel. The system 300 can then assign the first load to the first module 100 and the second module 100 and the second load to a third module 100.

The system 300 can again continuously or intermittently check to see if the vehicle power requirements have changed 1340. If, during the operation of the landing gear, for example, the power requirements change—e.g., the power required to start the motors is greater than the continuous power to run the motors—and/or the vehicle requests that the cabin fan be placed on high, the system 300 can decouple 1315*c* the first and second modules, pair the second and third modules and assign 1320*c* the first load (the landing gear) to the first module 100 and the second load (the cabin fan) to the second and third modules 100 as the load changes.

While several possible embodiments are disclosed above, embodiments of the present disclosure are not so limited. For instance, while several possible configurations have been disclosed for the parallel module converter components, other suitable configurations and components could be selected without departing from the spirit of the disclosure. In addition, the location and configuration used for various features of embodiments of the present disclosure such as, for example, the number of modules, the types of electronics used, etc. can be varied according to a particular aircraft or application that requires a slight variation due to, for example, the size or construction of the aircraft, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

The invention claimed is:

1. A parallel modular converter comprising:
a first parallel converter module configured to provide a first alternating current (AC) output signal and connected to a module communications bus;
a second parallel converter module configured to provide a second AC output signal and connected to the module communications bus;
a master logic controller configured to:
assign, responsive to receiving a first load request, one or more modules of the first parallel converter module and the second parallel converter module to power a first load specified by the first load request,
select, based on information indicating a type of the first load, a first control algorithm from a plurality of predefined control algorithms to be applied to the one or more modules, and
generate a command for a control switching network to route the first control algorithm to the one or more modules; and
a master communications controller connected to the module communications bus and configured to route control messages between the master logic controller and the one or more modules, wherein at least one of the first AC output signal and the second AC output signal are controlled responsive to the control messages.

2. The parallel modular converter of claim 1, wherein the master logic controller is configured to assign the first parallel converter module to power the first load, and is further configured to assign, responsive to receiving a second load request, the second parallel converter module to power a second load specified by the second load request.

3. The parallel modular converter of claim 1, wherein the one or more modules comprises the first parallel converter module and the second parallel converter module, wherein the master logic controller assigning the one or more modules to power the first load comprises:
operating a power switching network to arrange the first parallel converter module and the second parallel converter module in parallel.

4. The parallel modular converter of claim 1, further comprising:
a third parallel converter module configured to provide a third AC output signal and connected to the module communications bus,
wherein the one or more modules comprises the first parallel converter module, the second parallel converter module, and the third parallel converter module, wherein the master logic controller assigning the one or more modules to power the first load comprises:
operating a power switching network to arrange the first parallel converter module, the second parallel converter module, and the third parallel converter module in parallel.

5. The parallel modular converter of claim 1, further comprising:
a master protection controller configured to monitor one or more first inputs or first outputs of the first parallel converter module, and to monitor one or more second inputs or second outputs of the second parallel converter module,
wherein the master protection controller is further configured to deactivate, upon detecting a fault based on the monitored first inputs, first outputs, second inputs, and second outputs, at least one of the first parallel converter module and the second parallel converter module.

6. The parallel modular converter of claim 5, wherein the first inputs and the second inputs each comprise one or more of an input voltage and an input current.

7. The parallel modular converter of claim 5, wherein the first outputs and the second outputs each comprise one or more of an output voltage and an output current.

8. The parallel modular converter of claim 1, further comprising:
a master data logger coupled with the master communications controller and configured to log one or more datasets; and
a data storage medium configured to store the one or more datasets.

9. The parallel modular converter of claim 8, wherein the one or more datasets comprise one or more of master logic controller commands, master communications controller messages, failure messages, and sensor readings.

10. The parallel modular converter of claim 8, further comprising:
a data logging bus connecting the master data logger and the data storage medium,
wherein data logging communications are communicated via the data logging bus, and
wherein control communications are communicated via the module communications bus.

11. A method of providing power using at least a first parallel converter module and a second parallel converter module coupled with a module communications bus, the method comprising:
receiving, at a master logic controller, one or more load requests from one or more aircraft systems;
assigning, using the master logic controller, one or more modules of the first parallel converter module and the second parallel converter module to power one or more loads specified by the one or more load requests;
selecting, based on information indicating types of the one or more loads, at least a first control algorithm from a plurality of predefined control algorithms to be applied to the one or more modules;
generating a command for a control switching network to route the first control algorithm to the one or more modules;
routing, via a master communications controller coupled with the module communications bus, control messages between the master logic controller and the one or more modules; and
generating, based on the routed control messages, one or more of a first alternating current (AC) signal using the first parallel converter module and a second AC signal using the second parallel converter module to thereby power the one or more loads.

12. The method of claim 11, wherein the one or more load requests comprises a first load request received from a first aircraft system, the method further comprising:
arranging, using a power switching network, the first parallel converter module in parallel with the second parallel module converter module; and
assigning the first parallel converter module and the second parallel converter module to power a first load specified by the first load request.

13. The method of claim 11, wherein the one or more load requests comprises a first load request received from a first aircraft system, the method further comprising:
  arranging, using a power switching network, the first parallel converter module in parallel with the second parallel converter module and a third parallel converter module;
  assigning the first parallel converter module, the second parallel converter module, and the third parallel converter module to power a first load specified by the first load request; and
  generating a third AC signal using the third parallel converter module.

14. The method of claim 12, further comprising:
  detecting, using a master protection controller coupled with the module communications bus, a fault in the first parallel converter module;
  arranging, using the power switching network, the second parallel converter module in parallel with a third parallel converter module;
  assigning the second parallel converter module and the third parallel converter module to power the first load; and
  deactivating, using the master protection controller, the first parallel converter module.

15. The method of claim 11, wherein the one or more load requests comprises a first load request and a second load request received from the one or more aircraft systems, the method further comprising:
  assigning the first parallel converter module to power a first load specified by the first load request; and
  assigning the second parallel converter module to power a second load specified by the second load request.

16. A method for providing power comprising:
  receiving, at a master logic controller, a first load request from an external aircraft system, the first load request specifying a first load;
  assigning, using the master logic controller, a first parallel converter module of a plurality of parallel converter modules to power the first load;
  selecting, based on information indicating a type of the first load, a first control algorithm from a plurality of predefined control algorithms;
  providing, using a control switching network configured to route a selected control algorithm of the plurality of predefined control algorithms to a selected one or more of the plurality of parallel converter modules, the first control algorithm to the first parallel converter module; and
  connecting, using a first switch of a power switching network, the first parallel converter module to the first load to thereby power the first load according to the first control algorithm.

17. The method of claim 16, further comprising:
  arranging, using the power switching network, the first parallel converter module in parallel with a second parallel converter module of the plurality of parallel converter modules,
  wherein assigning the first parallel converter module to power the first load further comprises assigning the second parallel converter module to power the first load.

18. The method of claim 16, further comprising:
  receiving, at the master logic controller, a second load request from the external aircraft system, the second load request specifying a second load;
  assigning, using the master logic controller, a second parallel converter module of the plurality of converter modules to power the second load;
  providing, using the control switching network, a second control algorithm of the plurality of predefined control algorithms to the second parallel converter module; and
  connecting, using a second switch of the power switching network, the second parallel converter module to the second load to thereby power the second load according to the second control algorithm.

19. The method of claim 18, wherein one or both of the first control algorithm and the second control algorithm comprises a field-oriented control (FOC) motor control algorithm.

20. The method of claim 18, wherein one or both of the first control algorithm and the second control algorithm comprises a direct torque control (DTC) motor control algorithm.

21. The method of claim 18, wherein one or both of the first control algorithm and the second control algorithm comprises a voltage over frequency (V/F) motor control algorithm.

22. A method for providing power using a plurality of parallel converter modules, the method comprising:
  receiving, at a master logic controller, a first load request from a first external aircraft system, the first load request specifying a first load;
  receiving, at the master logic controller, a second load request from a second external aircraft system, the second load request specifying a second load;
  arranging, using a power switching network, a first parallel converter module of the plurality of parallel converter modules in parallel with a second parallel converter module of the plurality of parallel converter modules;
  assigning, using the master logic controller, the first parallel converter module and the second parallel converter module to power the first load, wherein assigning the first parallel converter module and the second parallel converter module comprises applying, using a control switching network configured to route a selected control algorithm of a plurality of predefined control algorithms to a selected one or more of the plurality of parallel converter modules, a first control algorithm of the plurality of predefined control algorithms to the first parallel converter module and the second parallel converter module;
  assigning, using the master logic controller, a third parallel converter module of the plurality of parallel converter modules to power the second load, wherein assigning the third parallel converter module comprises applying, using the control switching network, a second control algorithm of the plurality of predefined control algorithms to the third parallel converter module;
  detecting, using the master logic controller, an increase in the second load that would cause a rating of the third parallel converter module to be exceeded;
  detecting, using the master logic controller, a decrease in the first load such that the second parallel converter module is no longer needed to power the first load;
  rearranging, using the power switching network and upon determining that the second parallel converter module has capacity to meet the increase in the second load, the second parallel converter module in parallel with the third parallel converter module; and reassigning, using the master logic controller, the second parallel converter module to power the second load, wherein reassigning the second parallel converter module comprises generating a command for the control switching network to apply the second control algorithm to the second parallel converter.

23. The method of claim 22, wherein detecting the decrease in the first load comprises receiving, at the master logic controller, a request to disconnect the first load, the method further comprising:
disconnecting, using the power switching network, the first parallel converter module from the first load.

24. The method of claim 22, further comprising:
receiving, at the master logic controller, a request to disconnect the second load; and
disconnecting, using the power switching network, the second parallel converter module and the third parallel converter module from the second load.

25. The method of claim 22, wherein the first load request specifies a first load type of the first load and the second load request specifies a second load type of the second load,
wherein assigning the first parallel converter module and the second parallel converter module to power the first load further comprises selecting the first control algorithm based on the first load type, and
wherein assigning the third parallel converter module to power the second load further comprises selecting the second control algorithm based on the second load type.

26. A system comprising:
a master logic controller configured to receive a first load request and a second load request from a vehicle controller;
a control switching network in communication with the master logic controller, the control switching network configured to output, responsive to commands from the master logic controller, one or more control signals according to a selected one or more control algorithms of a plurality of predetermined control algorithms;
a plurality of inverters in communication with the control switching network for converting the one or more control signals to one or more alternating current (AC) output signals; and
a power switching network comprising a plurality of switches configured to selectively connect the plurality of inverters to one or more electrical loads,
wherein the master logic controller is further configured to:
select, based on information indicating a first type of a first load and a second type of a second load, a first control algorithm of the plurality of predetermined control algorithms to be applied to the first load and a second control algorithm of the plurality of predetermined control algorithms to be applied to the second load;
activate, responsive to the first load request, a first group of the plurality of switches in the power switching network to thereby connect a first group of the plurality of inverters to power the first load according to the first control algorithm, and
activate, responsive to the second load request, a second group of the plurality of switches in the power switching network to thereby connect a second group of the plurality of inverters to power the second load according to the second control algorithm.

27. A method of providing power comprising:
determining, using a master logic controller and responsive to a first request received from a first aircraft system, a first amount of power to be provided to a first load specified by the first request;
determining, using the master logic controller and based on the determined first amount of power, a first plurality of parallel converter modules to be activated to power the first load;
select, based on information indicating a first type of the first load, a first control algorithm to be applied to the first plurality of parallel converter modules through a control switching network, the control switching network configured to route a selected control algorithm of a plurality of predefined control algorithms to a selected one or more of the plurality of parallel converter modules;
determining a plurality of parameters of the first control algorithm;
instructing a power switching network to connect the first plurality of parallel converter modules in parallel with each other, and to connect the first plurality of parallel converter modules with the first load; and
instructing the control switching network to thereby apply the first control algorithm with the determined plurality of parameters to power the first load.

28. The method of claim 27, further comprising:
monitoring, using one or more temperature sensors, temperatures of the first plurality of parallel converter modules; and
removing, upon determining that a temperature of a first parallel converter module of the first plurality of parallel converter modules exceeds a predetermined value, the first control algorithm from being applied to the first parallel converter module, and
applying the first control algorithm to a second parallel converter module of the first plurality of parallel converter modules.

29. The method of claim 27, further comprising:
determining, using the master logic controller and responsive to a second request received from a second external aircraft system, a second amount of power to be provided to a second load;
determining, using the master logic controller and based on the determined second amount of power, a second plurality of parallel converter modules to be activated to power the second load;
determining a plurality of parameters of a second control algorithm to be applied to the second plurality of parallel converter modules through the control switching network;
instructing the power switching network to connect the second plurality of parallel converter modules in parallel with each other, and to connect the second plurality of parallel converter modules with the second load; and
instructing the control switching network to thereby apply the second control algorithm to power the second load.

* * * * *